US007413510B2

(12) United States Patent
Schlegel et al.

(10) Patent No.: US 7,413,510 B2
(45) Date of Patent: Aug. 19, 2008

(54) GAMING DEVICE HAVING A RELATED SYMBOL SELECTION GAME

(75) Inventors: Megan N. Schlegel, Reno, NV (US); Joseph E. Kaminkow, Reno, NV (US); Anthony J. Baerlocher, Reno, NV (US); Randall D. Mead, Reno, NV (US)

(73) Assignee: IGT, Reno, NV (US)

( * ) Notice: Subject to any disclaimer, the term of this patent is extended or adjusted under 35 U.S.C. 154(b) by 489 days.

(21) Appl. No.: 10/071,138

(22) Filed: Feb. 8, 2002

(65) Prior Publication Data

US 2003/0153378 A1 Aug. 14, 2003

(51) Int. Cl.
*A63F 9/24* (2006.01)
*A63F 13/00* (2006.01)
*G06F 17/00* (2006.01)

(52) U.S. Cl. ............................ 463/16; 463/20; 463/21; 463/42

(58) Field of Classification Search .............. 273/138.1, 273/138.2, 292, 293, 139; 463/9–13, 16–29, 463/40, 42, 36, 37
See application file for complete search history.

(56) References Cited

U.S. PATENT DOCUMENTS 3,825,255 A * 7/1974 Kennard et al. ............. 273/139
4,695,053 A 9/1987 Vazquez, Jr. et al.
5,046,737 A 9/1991 Fienberg
5,092,598 A * 3/1992 Kamille ...................... 273/139
5,342,047 A * 8/1994 Heidel et al. .................. 463/29
5,647,798 A 7/1997 Falciglia (Continued)

FOREIGN PATENT DOCUMENTS

EP 0874337 A1 10/1998

(Continued)

OTHER PUBLICATIONS

Bullseye I (The Price is Right), printed from http://gscentral.net/pricing1.htm on Jan. 11, 2006, available prior to Feb. 8, 2002.*

(Continued)

*Primary Examiner*—Robert Pezzuto
*Assistant Examiner*—Sunit Pandya
(74) *Attorney, Agent, or Firm*—Bell, Boyd & Lloyd LLP

(57) ABSTRACT

The present invention relates to a gaming device and method having a bonus game, where the bonus game displays a target set including a plurality of player selectable symbols. At least one of the symbols is designated as a target symbol in a target set. The gaming device provides a predetermined number of picks to begin a bonus game and enables a player to use the picks to pick symbols from the target set. If the player picks a symbol that is not a target symbol, a relationship indicator indicates the relationship between the target symbol and the picked symbol. The player continues to pick symbols in the target set until the player picks the target symbol. If the player picks a target symbol, the gaming device enables the player to pick symbols from a new target set. The player continues to pick symbols in target sets until the player has no picks remaining. Preferably, the gaming device provides an award for each picked target symbol.

71 Claims, 13 Drawing Sheets

U.S. PATENT DOCUMENTS

| | | | | |
|---|---|---|---|---|
| 5,755,619 | A | 5/1998 | Matsumoto et al. | |
| 5,855,514 | A * | 1/1999 | Kamille | 463/25 |
| 5,902,184 | A | 5/1999 | Bennett et al. | |
| 5,919,088 | A | 7/1999 | Weiss | |
| 5,931,467 | A | 8/1999 | Kamille | |
| 5,997,401 | A | 12/1999 | Crawford | |
| 6,015,346 | A | 1/2000 | Bennett | |
| 6,059,289 | A | 5/2000 | Vancura | |
| 6,089,976 | A | 7/2000 | Schneider et al. | |
| 6,102,400 | A | 8/2000 | Scott et al. | |
| 6,102,798 | A | 8/2000 | Bennett | |
| 6,126,542 | A | 10/2000 | Fier | |
| 6,142,873 | A | 11/2000 | Weiss et al. | |
| 6,159,097 | A | 12/2000 | Gura | |
| 6,159,098 | A | 12/2000 | Slominy et al. | |
| 6,164,652 | A | 12/2000 | Lauretta et al. | |
| 6,174,235 | B1 | 1/2001 | Walker et al. | |
| 6,176,487 | B1 | 1/2001 | Eklund et al. | |
| 6,186,894 | B1 | 2/2001 | Mayeroff | |
| 6,224,482 | B1 | 5/2001 | Bennett | |
| 6,224,483 | B1 | 5/2001 | Mayernoff | |
| 6,227,969 | B1 | 5/2001 | Yoseloff | |
| 6,231,445 | B1 | 5/2001 | Acres | |
| 6,261,177 | B1 | 7/2001 | Bennett | |
| 6,270,412 | B1 | 8/2001 | Crawford et al. | |
| 6,309,300 | B1 | 10/2001 | Glavich | |
| 6,312,334 | B1 | 11/2001 | Yoseloff | |
| 6,315,662 | B1 | 11/2001 | Jorasch et al. | |
| 6,315,664 | B1 | 11/2001 | Baerlocher et al. | |
| 6,319,124 | B1 | 11/2001 | Baerlocher et al. | |
| 6,322,309 | B1 | 11/2001 | Thomas et al. | |
| 6,346,043 | B1 | 2/2002 | Colin et al. | |
| 6,347,996 | B1 | 2/2002 | Gilmore et al. | |
| 6,398,644 | B1 | 6/2002 | Perrie et al. | |
| 6,413,160 | B1 | 7/2002 | Vancura | |
| 6,439,995 | B1 | 8/2002 | Hughs-Baird et al. | |
| 6,443,837 | B1 | 9/2002 | Jaffe et al. | |
| 6,491,583 | B1 | 12/2002 | Gauselman | |
| 6,506,117 | B2 | 1/2003 | DeMar et al. | |
| 6,561,902 | B1 * | 5/2003 | Walker et al. | 463/25 |
| 6,589,114 | B2 | 7/2003 | Rose | |
| 6,592,457 | B1 | 7/2003 | Frohm et al. | |
| 6,595,859 | B2 * | 7/2003 | Lynn | 463/42 |
| 6,607,437 | B2 | 8/2003 | Casey et al. | |
| 6,988,732 | B2 * | 1/2006 | Vancura | 273/274 |
| 2002/0187827 | A1 | 12/2002 | Blankstein | |
| 2003/0027616 | A1 | 2/2003 | Vancura | |
| 2003/0036419 | A1 | 2/2003 | Baerlocher et al. | |
| 2003/0060266 | A1 | 3/2003 | Baerlocher et al. | |

FOREIGN PATENT DOCUMENTS

| | | | |
|---|---|---|---|
| EP | 0945837 | A2 | 9/1999 |
| EP | 0984409 | A2 | 3/2000 |
| EP | 1 266 677 | A1 | 12/2002 |
| EP | 1266677 | A1 | 12/2002 |
| EP | 1 298 607 | A2 | 2/2003 |
| WO | WO 00/12186 | | 3/2000 |

OTHER PUBLICATIONS

Fortune Hunter Brochure written by Aristocrat, published in 1995.

Wheel of Fortune Brochure written by IGT, published in 1998.

Spell Binder Article written by Strictly Slots, published in 2000.

Fortune Cookie Brochure written by IGT, published in 2000.

The Munsters Article and Website Page written by IGT, published in 2000, printed Mar. 21, 2001.

Who Done It Brochure written by WMS, published date not known.

In Between Game Description written by IGT, not dated.

Double Up Potter Game Description written by IGT, not dated.

South Park Brochure written by IGT, published in 2000.

Ghoulish Gamble written by IGT, published date unknown.

Believe It or Not Article published by Strictly Slots in Jun. 2001.

A Salute to Game Shows-The Price is Right-Pricing Games printed from website gscentral.net/clock.htm printed on Aug. 16, 2000.

Clock Game printed from website www:gscentral.net, published in 1972.

Deep Pockets Advertisement, written by IGT, published in 2002.

Deep Pockets Article, written by Strictly Slots, published in 2002.

The Price is Right printed from website www.curtallaiume.com, published on Jul. 18, 2002.

Schwartz, David, Ryan, Steve, and Wostbrock, Fred. The Encyclopedia of TV Game Shows. Third Ed. Checkmark Books, New York: 1999 pp. 176-180.

Ten Chances printed from website www.gscentral.net, published in 1975.

Bullseye I (The Price Is Right), printed from http://gscentral.net/pricing1.htm on Feb. 7, 2006, available prior to Feb. 8, 2002.

Clock Game (The Price Is Right), printed from http://gscentral.net/pricing1.htm on Feb. 7, 2006, available prior to Feb. 8, 2002.

Dice Game (The Price Is Right), printed from http://gscentral.net/pricing1.htm on Feb. 7, 2006, available prior to Feb. 8, 2002.

Penny Ante (The Price Is Right), printed from http://gscentral.net/pricing1.htm on Feb. 7, 2006, available prior to Feb. 8, 2002.

* cited by examiner

GAMING DEVICE HAVING A RELATED SYMBOL SELECTION GAME

CROSS REFERENCE TO RELATED APPLICATIONS

This application is related to the following commonly-owned co-pending patent applications: "Gaming Device Having A Multiple Selection Set Bonus Scheme," Ser. No. 09/680,592, Gaming Device Having Player Selectable Award Digits and Award Modification; Ser. No. 091/934,003; and "Gaming Device Having Award Modification Options for Player Selectable Award Digits," Ser. No. 09/933,843.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having a related symbol selection game.

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having a secondary or bonus games generally employ a triggering event that occurs during the base game operation of the gaming device. The triggering event temporarily stalls or halts further base game play and enables a player to enter a second, different game, which is the bonus game. The player plays the bonus game, likely receives a bonus award, and returns to the base game.

Currently, gaming machines or devices such as slot machines provide bonus games wherein a player has one or more opportunities to select one or more symbols from a plurality of possible symbols. If the player selects one of the designated winning symbols or a winning combination of symbols, the game awards the player a bonus value such as credits. The outcome depends upon the particular symbol or symbols obtained by the player. If the player selects a terminating symbol, the game ends.

One known gaming device is the SPELLBINDER™ gaming device. For the bonus game of the SPELLBINDER™ gaming device, the gaming device displays the numbers one to twelve to a player. The gaming device selects one of the numbers from the set of numbers. The gaming device requires the player to input whether the player believes that the next number will be higher or lower than the selected number. If the player picked correctly, the gaming device provides an award to the player and repeats the process. If the player does not pick correctly, the bonus game ends.

Other various bonus games have been associated with gaming machines. Therefore, to increase player enjoyment and excitement, it is desirable to provide new bonus games for gaming machines.

SUMMARY OF THE INVENTION

The present invention provides a gaming device and in particular a secondary or bonus game of a gaming device that includes at least one target set. The target set has a plurality of symbols including at least one symbol which is randomly designated to be the target symbol. The gaming device enables a player to pick symbols from the target set until the player selects the target symbol or runs out of picks. In one embodiment, the player receives a predetermined number of picks when the game begins. After the player picks a symbol, a relationship indicator identifies the relationship between the picked symbol and the target symbol in the target set. If the picked symbol is not (or does not match) the target symbol, the relationship indicator indicates the relationship of the target symbol to the picked symbol. The player continues to pick symbols from the target set until the player obtains the target symbol or runs out of picks. Preferably, the player receives an award for picking the randomly designated target symbol. It should be appreciated that the number of or type of target symbols in each target set may vary. Also, the target symbols may be the same symbols, different symbols or any combination of symbols in each bonus game.

In one embodiment, the gaming device includes a plurality of target sets and provides an award to the player for each picked target symbol in each set. In one embodiment, the player has a total cumulative number of picks the player can use in selecting symbols in all of the target sets. Each target symbol is associated with an award and the player's total award is based on the sum of the individual awards for each picked target symbol. It should also be appreciated that the processor or controller of the gaming device could randomly determine the awards for the target symbols. In accord with one aspect of the invention, each award is associated with a probability of being associated with a target symbol such that one award has a greater probability of being associated with a target symbol than another award.

In another embodiment, the gaming device provides an award to the player based on the target symbols picked by the player. In one such embodiment, the symbols in each target set are numbers, such as the integers from zero to nine, and the target symbol is one of the numbers. When the player picks the target number, the gaming device uses the picked target number to determine the player's award. In one embodiment, the player receives the sum of the awards associated with each picked target symbol in a target set or sets. In an alternative embodiment, the player could receive an award or combined award based on completing an award combination. In this alternative embodiment, the award or combined award is a combination of the target numbers. The combination is formed by placing the target numbers in the combination based on the order that the target numbers are picked or alternatively, in another suitable order. Each picked target number makes up a digit of the combined award. If the player picks several target numbers, the player's award is an order of the digits of the target numbers.

In a further embodiment, the gaming device provides the player with a number of picks. The gaming device also displays a masked combination of target numbers. The combination is formed by randomly selecting and placing target numbers in the combination based on the order that the target numbers are picked by the processor or in another suitable order. The combination may also be predetermined by the processor. Each picked target number makes up a digit in the combination. If the player picks all of the target numbers or digits in the combination, the gaming device preferably provides an award to the player. The award in one embodiment is based on the number of picks that the player has remaining. In one alternative embodiment, the player uses the player's remaining picks to select additional awards or prizes. In another embodiment, the player is provided with another bonus level or bonus game and the player uses their remaining picks in that bonus level or bonus game to obtain larger awards.

In another embodiment, the award provided to the player for picking all of the target symbols in a target combination is based on the number of picks that the player actually uses to obtain the combination. In this embodiment, the gaming device provides a larger award to the player for using less picks to obtain the target symbol combination.

In an alternative embodiment, the number of picks provided to the player is not displayed to the player. In this embodiment, the player's excitement and enjoyment of the gaming device increases because the player does not know when the player's picks will run out and therefore, when the game will end.

Although the present invention is discussed relative to a bonus game of a gaming machine, it should be appreciated that the present invention could be employed as a primary game in a gaming device.

It is therefore an advantage of the present invention to provide a gaming device having a related symbol selection game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
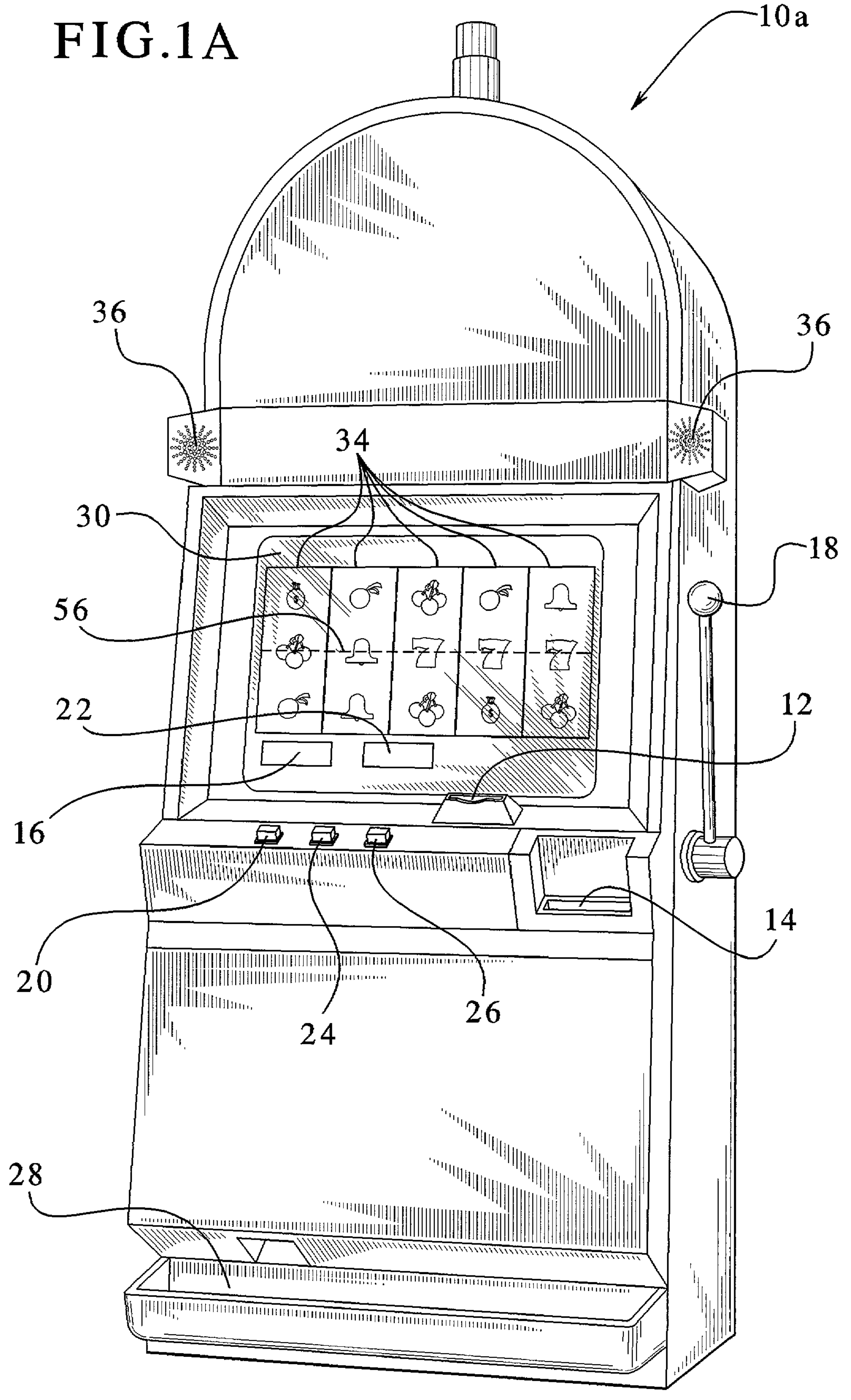
FIG. 1A is front perspective view of one embodiment of the gaming device of the present invention.
Figure 1B:
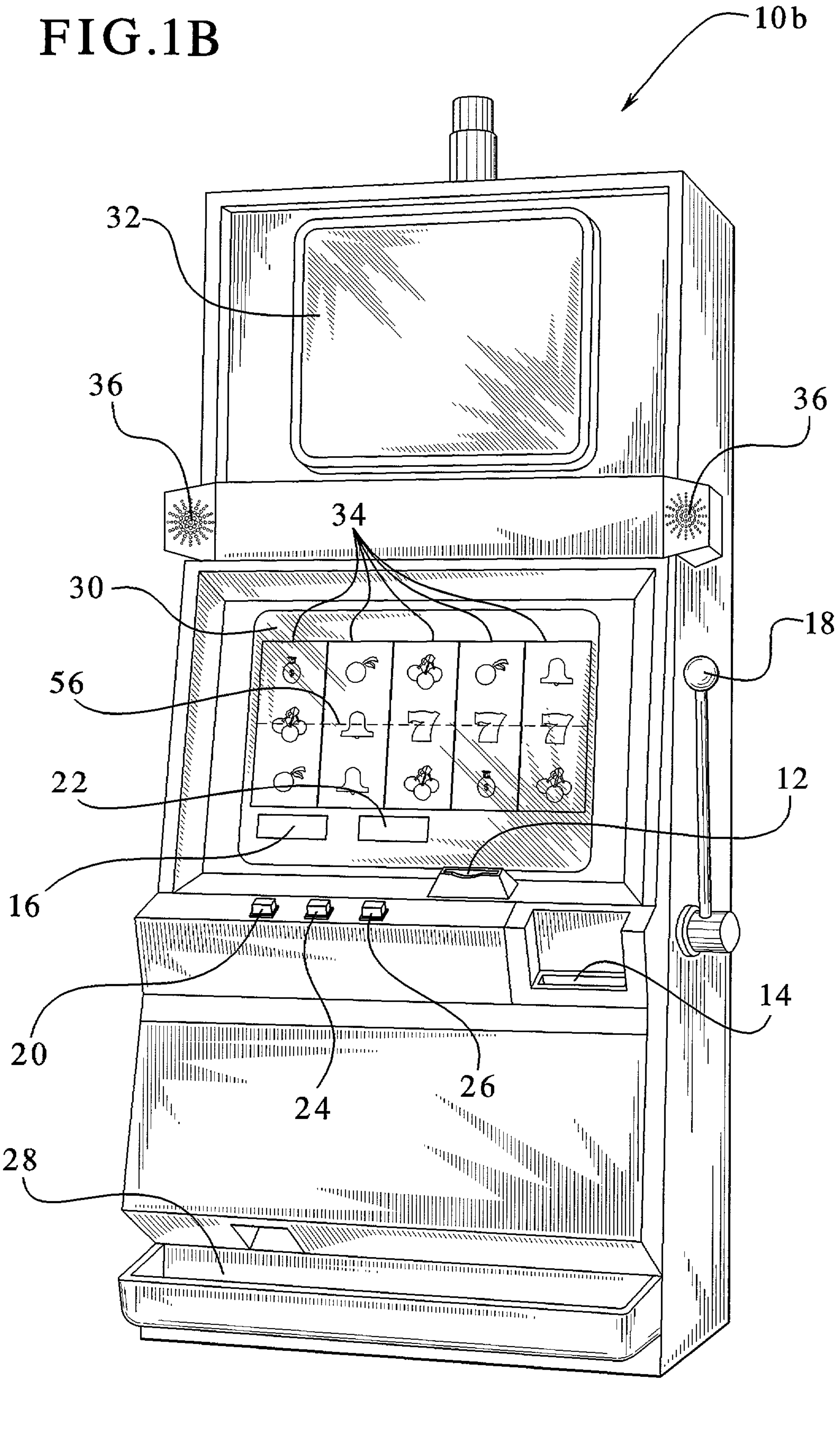
FIG. 1B is front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other storage or memory device which a player can use in a desktop or laptop personal computer or other computerized platform.

Gaming device 10 can incorporate any primary game such as slot, poker, blackjack or keno, any of their bonus triggering events and any of their bonus games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming device can also include other conventional wagoring indicators such as a bet max button A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. The illustrated gaming device 10 displays a plurality of reels 34 (i.e., five reels 34) in video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
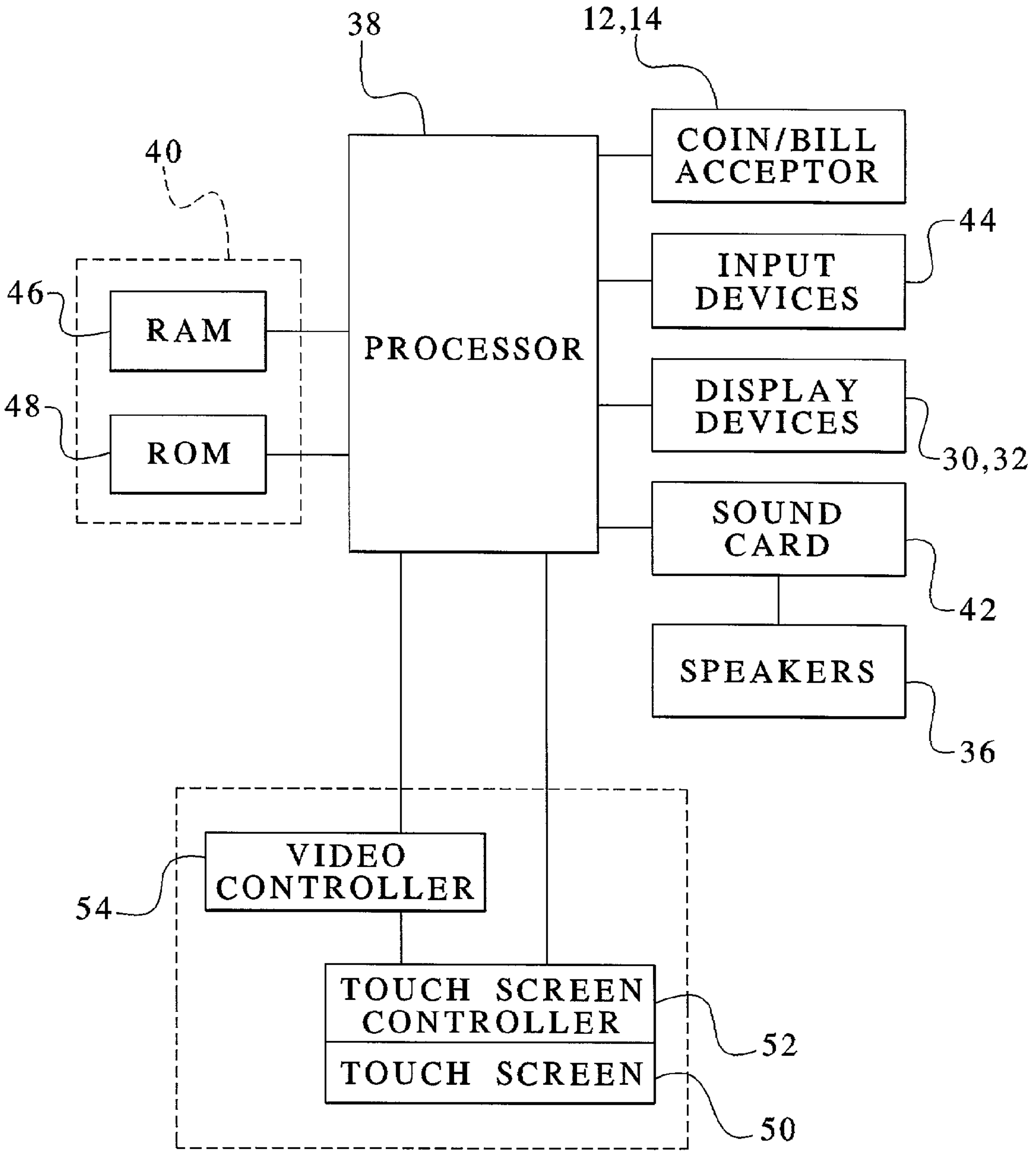
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively or individually referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. In the slot embodiment, the reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 may also give players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. The qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

In one embodiment of the present invention, if a player achieves a bonus triggering or qualifying condition during the primary game, the gaming device 10 automatically initiates the bonus game of the present invention.

Figure 3:
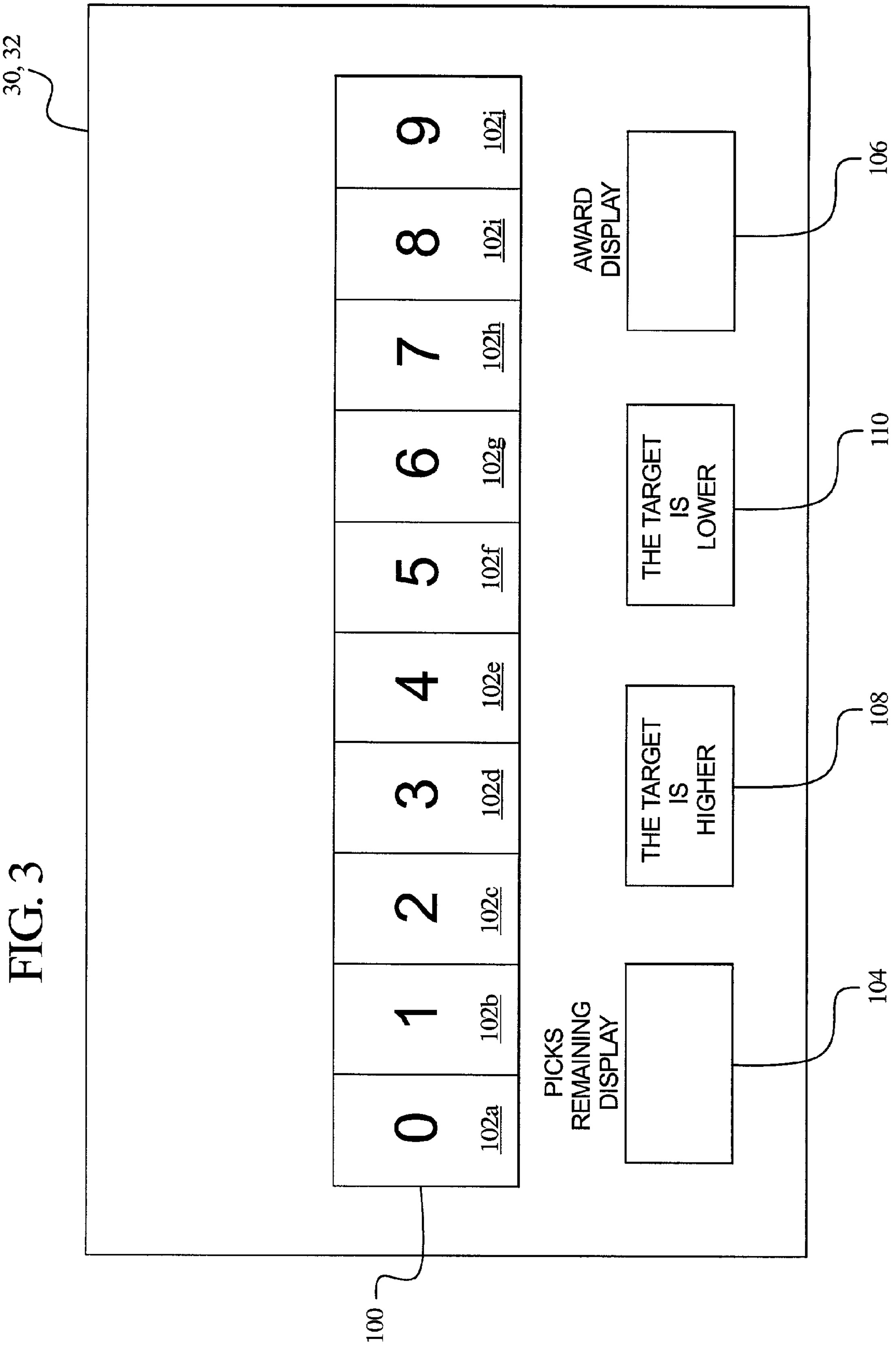
FIG. 3 is an enlarged front elevation view of one of the display devices of FIGS. 1A and 1B, which illustrates one embodiment of the present invention where the symbols in the target set are numbers.

Referring to FIG. 3, one embodiment of the display device 30 or 32 of the present invention is illustrated. The display device 30 or 32 displays a target set 100 including a plurality of player selectable symbols 102*a* to 102*j* (generally referred to as symbols 102). At least one of the symbols 102 in the target set 100 is randomly determined by the processor as the target symbol for each play of the bonus game. Although this embodiment shows one target set, it should be appreciated that in other embodiments, a bonus game may include multiple target sets. In such an embodiment, the gaming device enables a player to pick a symbol in each target set. The gaming device provides an award to the player for each picked target symbol in the target sets.

In the illustrated embodiment, the symbols are numbers and particularly integers from zero to nine. The symbols, however, may be any suitable symbols as desired. Also, the numbers are preferably displayed in sequential order starting with the lowest value on the left to the highest value on the right. It should be appreciated that any logical order may be displayed to a player based on the symbols being used in the bonus game. The order of the symbols (i.e., zero to nine) in this embodiment illustrates the relationship of the symbols to one another.

The display device includes a picks remaining display 104, an award display 106 and relationship indicators 108 and 110.

The picks remaining display 104 indicates the number of picks that are remaining in a bonus game. At the start of a game, the gaming device determines the total number of picks for that bonus game and displays the number of picks in the picks remaining display 104. The picks remaining display 104 decreases by one after each pick by a player. Thus, at any point in the game, the player knows how many picks are remaining in that game and may adjust the player's strategy accordingly. When the picks remaining display indicates that there are no picks remaining in a game, the bonus game ends.

The award display 106 indicates the total award received by a player in the bonus game. During a bonus game, any awards received by a player are added to the award indicated by the award display 106. Once a bonus game ends, the total award indicated by the award display 106 is provided to the player.

The relationship indicators 108 and 110, indicate the relationship between a picked symbol and the target symbol in the target set. In the illustrated embodiment in FIG. 3, the target set 100 includes ten symbols 102*a* to 102*j*, designated with the numbers zero through nine. Since the target set includes numbers, the relationship indicators 108 or 110 indicate whether a target number is higher or lower than a picked number in a target set. If the target number is higher than a picked number, the relationship indicator 108 is highlighted or illuminated to indicate this relationship to the player. If the target number is lower than a picked number, the relationship indicator 110 is highlighted or illuminated to indicate this relationship to the player. It should be appreciated that the relationship indicators 108 and 110 may indicate any relationship between a target symbol and a picked symbol. Although there are two relationship indicators in this illustration, a gaming device may have one or more relationship indicators as desired by the game implementor.

Figure 4:
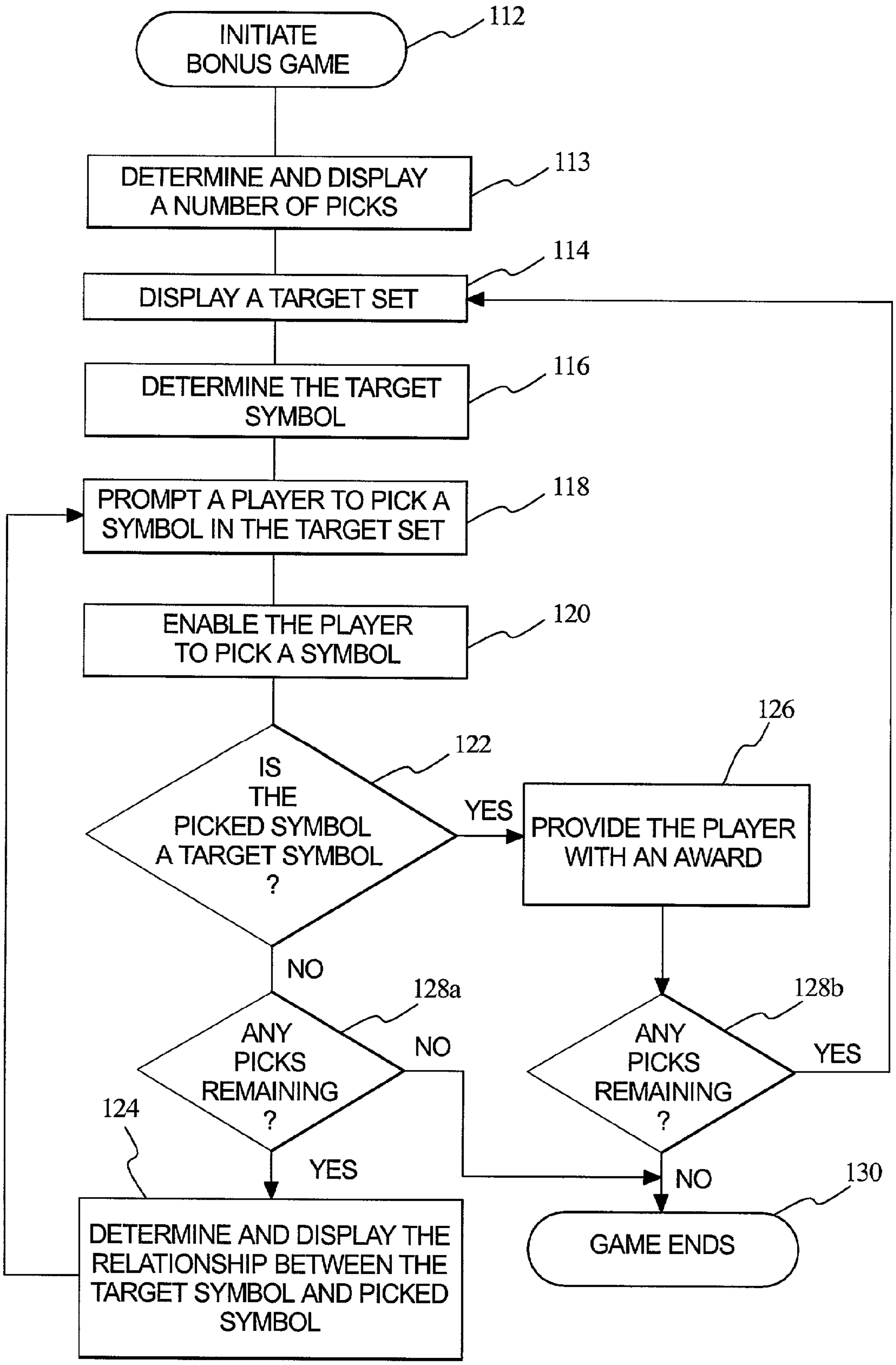
FIG. 4 is a flow diagram of one embodiment of the present invention implemented in a bonus game.

One embodiment of the bonus game of the present invention which includes multiple target sets operates according to the flow diagram in FIG. 4. The gaming device initiates a bonus game as indicated by block 112. Initially, a player receives a predetermined number of picks to start a bonus game as indicated by block 113. However, it should be appreciated that the number of picks may be randomly determined or be any number desired by the implementor. By limiting the number of picks, the chances of obtaining multiple target symbols and thereby multiple awards in this embodiment with multiple target sets becomes more difficult. Therefore, a player is challenged to obtain as many target symbols as possible before running out of picks in the bonus game. Such a challenge adds to a player's excitement and enjoyment of the game.

The gaming device then selects and displays a target set including a plurality of symbols as indicated by block 114. In one embodiment, the game displays a plurality of numbers ranging from 0 to 9. While numbers are discussed, it should be appreciated that any symbols are contemplated, including letters A to Z, signs of the Zodiac, months of the year, characters, city names, state names, etc. It is preferred that the symbols are orderly arranged such as in a sequential order in displayed the target set.

The game determines one symbol to be the target symbol in the target set as indicated by block 116. Preferably, the target symbol is randomly determined, however it should be appreciated that a target symbol may be a predetermined symbol in the target set. The target symbol is not displayed to the player until the player picks the target symbol in the target set.

Next, the gaming device prompts the player to select a symbol from the target set as indicated by block 118, which the player believes may be the target symbol in the target set. The prompt may be a statement or message displayed on the display device 30 or 32, or it may be a cursor that flashes and notifies the player to select another symbol. It should be appreciated that the prompt may be any type of prompt initiated by the gaming device 10.

Once the player picks a symbol, the gaming device 10 completes a series of decisions as illustrated by the decision diamonds in the flow diagram of FIG. 4. The processor of the gaming device 10 first determines if the picked symbol is a target symbol as indicated by decision diamond 122. The processor of the gaming device compares the picked symbol to the predetermined target symbol in the target set.

If the picked symbol is the target symbol, the gaming device highlights the target symbol in some manner to notify the player that the player picked the target symbol in the target set. It should be appreciated that the target symbol may be highlighted by illuminating it, changing the color of the target symbol or by any other desired method. The gaming device then provides the player with an award as indicated by block 126. In the embodiment where there is only one target set in the game, the bonus game ends. In the embodiment where there are several target sets in a bonus game, the processor of the gaming device 10 must determine if the player has any picks remaining in the bonus game as indicated by decision diamond 128*b*. If there are no picks remaining in the game, the game ends as indicated by oval 130. The player receives the total award for that bonus game.

The player receives an award for each picked target symbol. In one embodiment with multiple target sets, the gaming device provides the player with an award associated with a target symbol. However, it is contemplated that the award value may also be randomly generated by the processor 38. In one embodiment of the present invention, the awards associated with the target symbols are associated with probabilities such that one award has a greater probability of being associated with a target set or symbol than another award.

In another embodiment, the gaming device provides an award to a player based on the order in which the target symbols are picked. In this embodiment, target symbols are preferably numbers and the player's award is the value of the target number itself. When a player picks a target number, the target number is separately displayed on the display device. Any subsequently picked target numbers are displayed in sequential order next to the previously picked target number or numbers. The player receives the total award designated by the combination of the individual awards from each target symbol. For example, a target set includes the numbers one through nine. A player picks a target number one from a first target set. Then the player picks target number zero from a second target set and target number nine from a third target set. The player's total award for that bonus game is one hundred nine based on the sequential order of the picked target symbols. It should be appreciated that a player may receive the sum of the individual awards or some other suitable award as desired by the game implementor.

If the player has picks remaining in the bonus game, the gaming device 10 displays a new target set with a plurality of symbols to the player as indicated by block 114. The gaming device determines the target symbol and prompts the player to pick a symbol from the target set as indicated by blocks 116 and 118 respectively. The gaming device then repeats the steps described above starting at block 120.

If the player picks a symbol that is not the target symbol, the gaming device 10 must determine whether the player has any picks remaining in the bonus game as indicated by decision diamond 128*a*. If the player has picks remaining, the gaming device determines the relationship between the picked symbol and the target symbol. Once the relationship is determined, the gaming device displays the relationship to the player as indicated by block 124. The gaming device prompts the player to pick another symbol as indicated by block 118. The process described above is repeated until the player picks a target symbol in the target set or the player runs out of picks. If, however, the player does not have any picks remaining in block 128A, the game ends as indicated by block 130 and the bonus game award total is transferred to the player.

FIGS. 5A to 5K illustrate an example of one embodiment of the present invention. In this example, the target set symbols are numbers and the player starts out the game with seven picks. Also, the player does not start out with any symbols being revealed or with any type of award as shown by display 106.

Figure 5A:
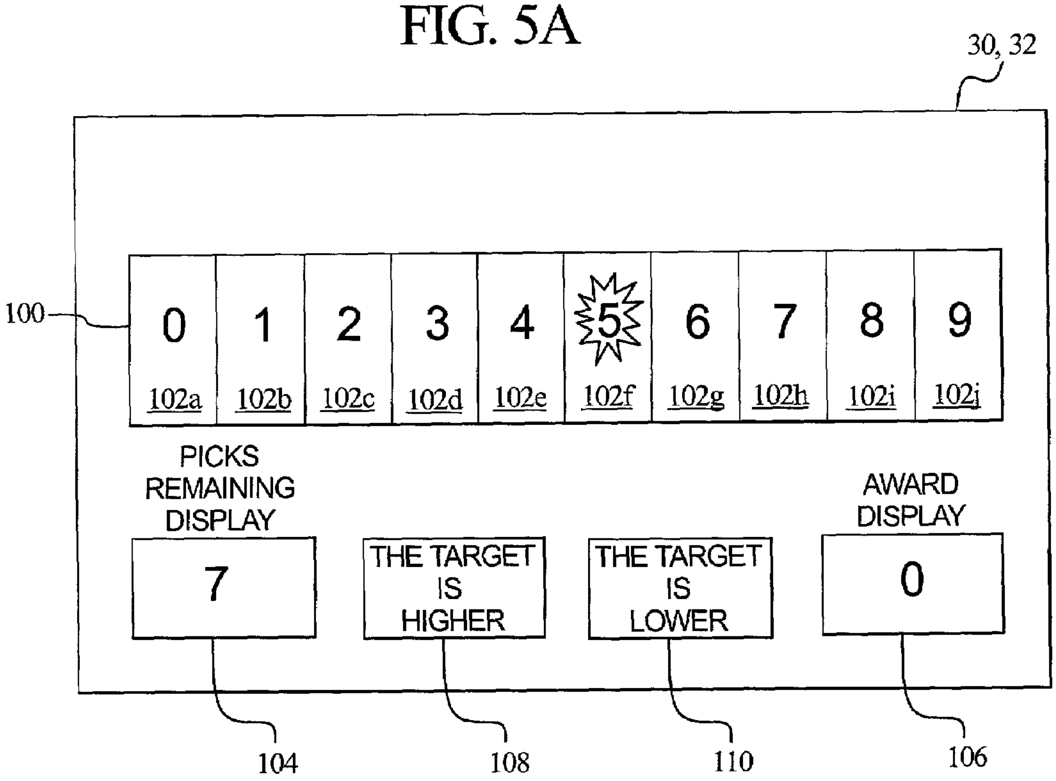
FIGS. 5A and 5B are enlarged front elevation views of one of the display devices of FIGS. 1A and 1B illustrating a first pick by a player in a target set and the response by the gaming device.

Referring to FIG. 5A, a display device 30 or 32 including a first target set 100 with a plurality of target symbols or numbers 102*a* through 102*j* is illustrated. This embodiment includes a plurality of target sets. The gaming device randomly determines one of the numbers zero through nine to be the target symbol or target number in the first target set. The gaming device selects nine as the target number. The target number is not identified to the player until the player picks the target number in the target set. The gaming device then prompts the player to pick a number from the target set in a suitable manner (not shown) such as using a touch screen or other symbol or number selector connected to the processor. In this game, the player's first pick is the number five designated as 102*f* from the target set 100.

Figure 5B:
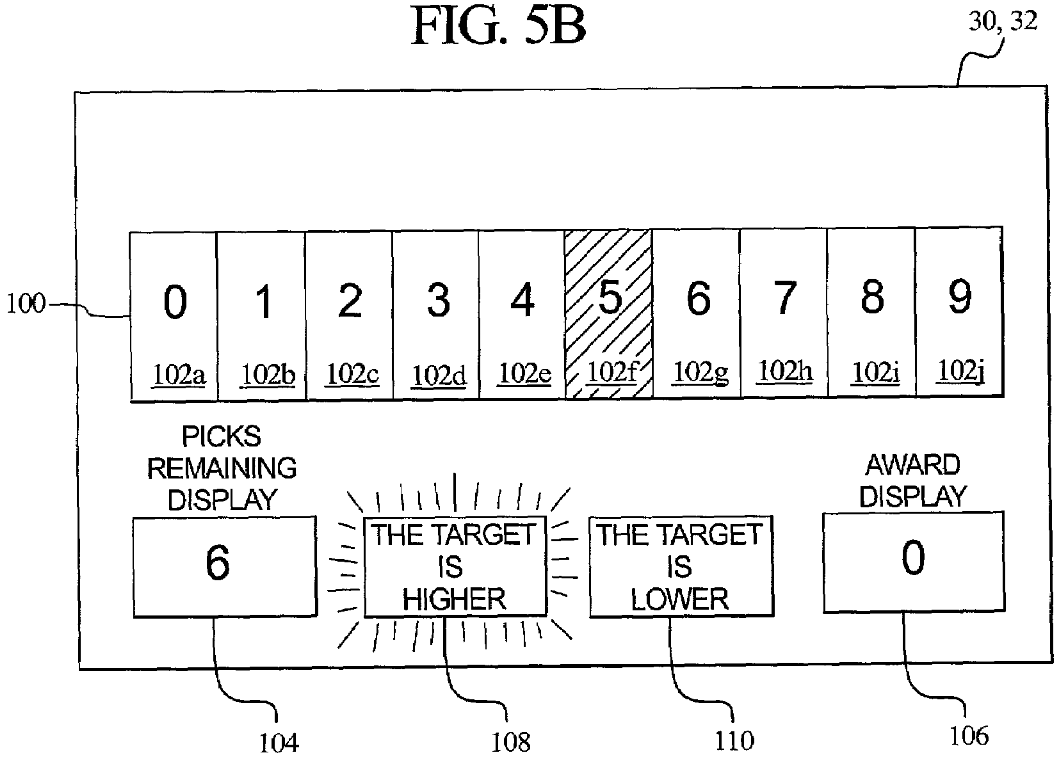

Referring now to FIG. 5B, the number five is highlighted as being the player's first pick. The processor of the gaming device 10 now determines whether the player's first pick is the target number which is nine, or whether the target number is higher or lower than the picked number. In this example, the gaming device compares the first pick 102*f* to the target number nine. The gaming device 10 determines that the target number is higher than the picked number, five, and therefore highlights the relationship indicator 108. Relationship indicator 108 illuminates to notify the player that the target symbol is higher than the first picked number. The player must pick a symbol that is higher than their first pick so that they have a chance to obtain the target symbol. Also, the pick remaining display 104 now shows that there are six picks remaining in the bonus game.

Figure 5C:
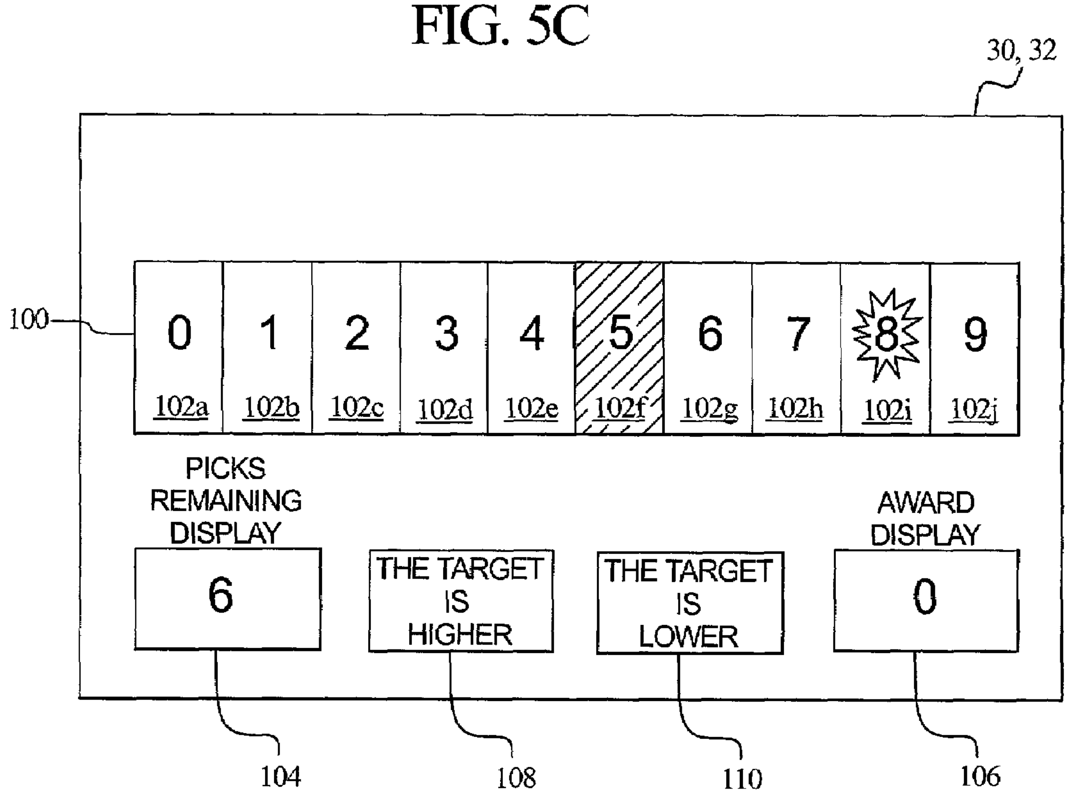
FIGS. 5C and 5D are enlarged front elevation views of one of the display devices of FIGS. 1A and 1B illustrating a second pick by a player in the target set and the response by the gaming device.
Figure 5D:
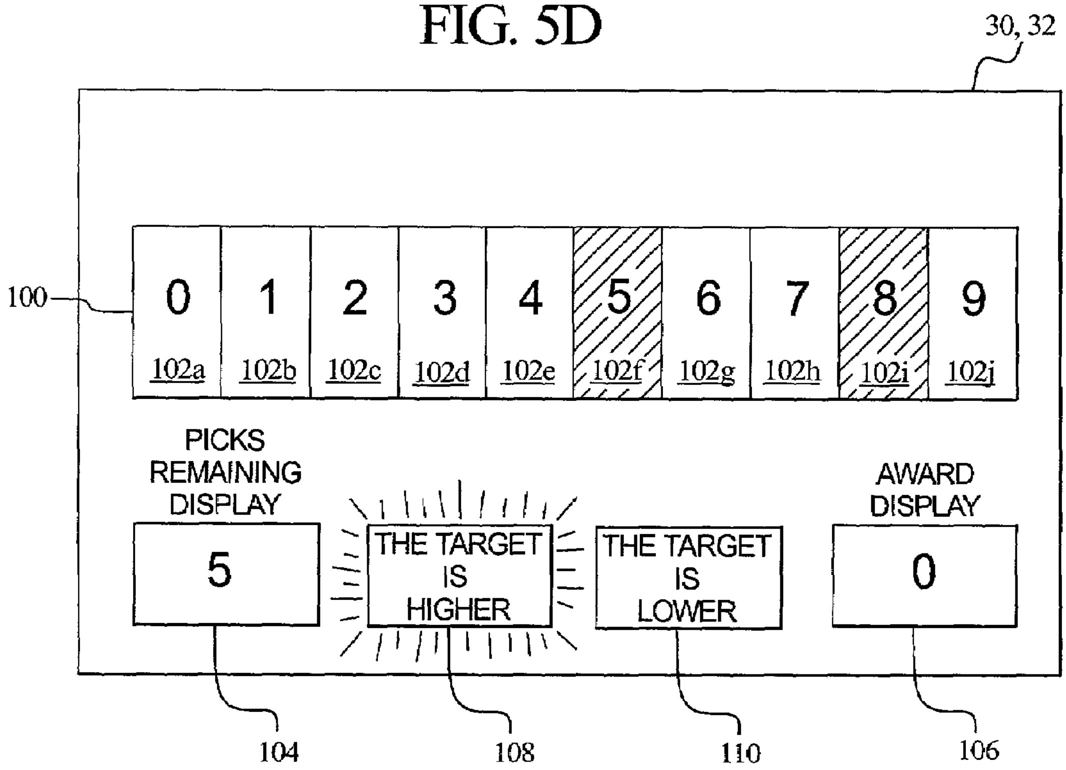

The player makes their second pick from the group of numbers 102 in target set 100 as illustrated in FIG. 5C. The player picks the number eight, designated as 102*i*, which is highlighted. The processor of the gaming device determines that the target number nine is still higher than the second pick and therefore highlights the relationship indicator 108 as illuminated in FIG. 5D. Relationship indicator 108 illuminates to notify the player that the target number is higher than the picked number. Because there is only one number higher than the player's last pick, the player will likely obtain the target symbol on their next pick. It should be appreciated that although the next pick appears obvious, the player preferably must make the correct pick of the target number. If by chance, the player picks a different number, the game will continue as described above. In one embodiment of the bonus game, the player will automatically obtain the target number when there is only one possible pick remaining in the target set. In another embodiment, the processor deactivates numbers that were selected by the player and were not the target numbers. In this embodiment, the player eventually obtains the target number when all of the other numbers in the target set, except the target number, are deactivated by the processor. Referring to FIG. 5D, the player has five picks remaining in the bonus game as indicated by the pick remaining display 104.

Figure 5E:
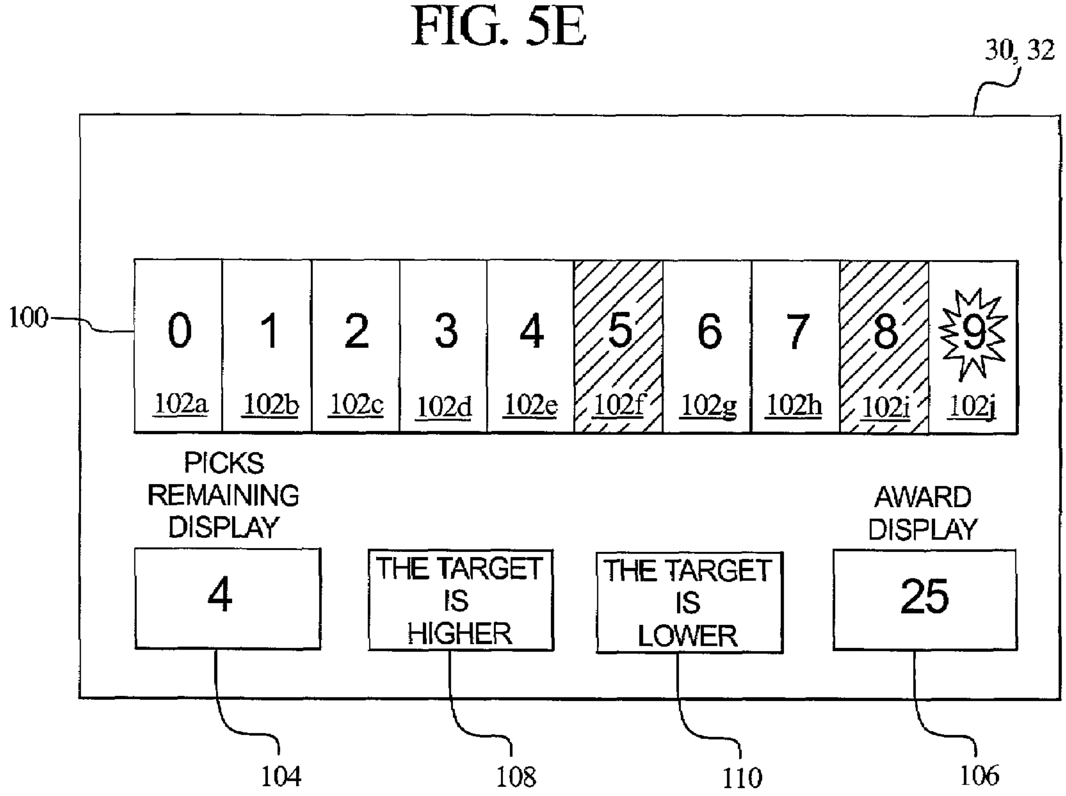
FIG. 5E is an enlarged front elevation view of one of the display devices of FIGS. 1A and 1B illustrating a third pick by a player in the target set, which is the target symbol, and an award associated with the target symbol.

Referring now to FIG. 5E, the player picks the first target number. The player picked the number nine which is the target number in the target set 100. Thus, an award, which in this embodiment is a predetermined award value of twenty-five, is displayed in the award display 106. The player still has four picks remaining in the bonus game as indicated in the pick remaining display 104 and therefore continues to play the bonus game. It should thus be appreciated that in this embodiment, the number of picks the player uses for each target set will determine the number of picks available to the player for subsequent target sets.

Figure 5F:
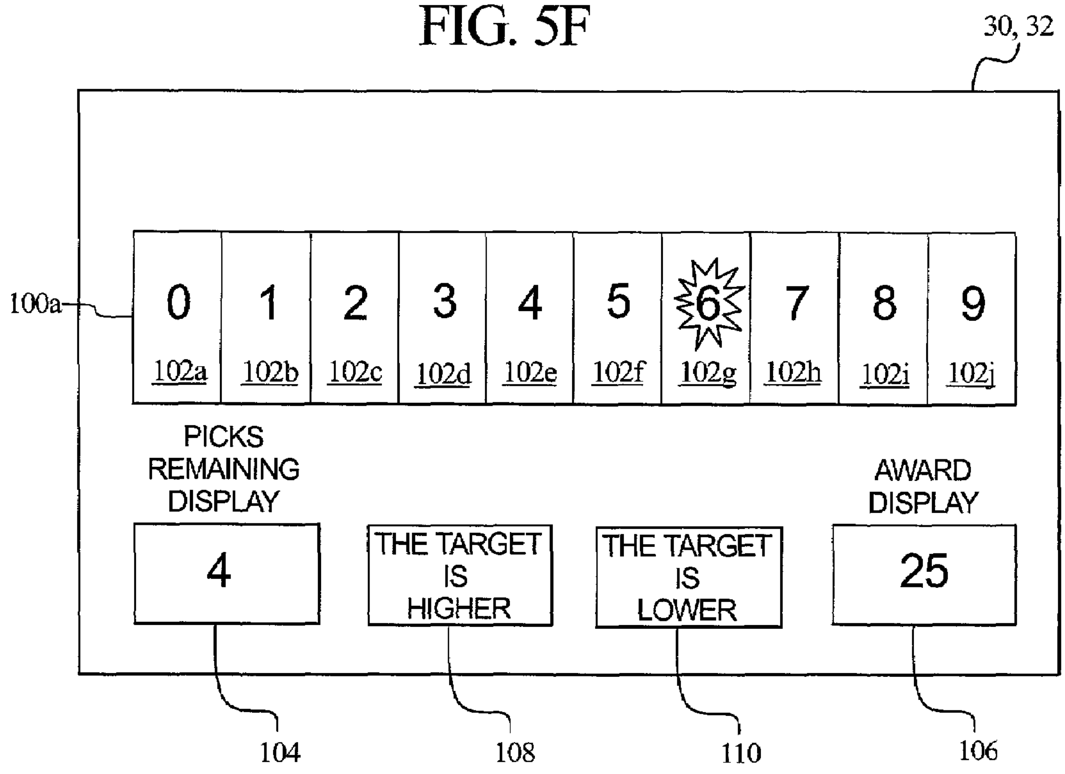
FIGS. 5F and 5G are enlarged front elevation views of one of the display devices of FIGS. 1A and 1B illustrating a first pick by the player in a new target set, which is the fourth overall pick in the bonus game, and the response by the gaming device.

In FIG. 5F, the player is now trying to match a second target number in a new target set 100*a*. The gaming device determines the target number to be the number four (102*d*) from the second target set. As illustrated, the picked numbers that were highlighted previously, are not highlighted anymore because the player is attempting to obtain a new target number in a new target set 100.

Figure 5G:
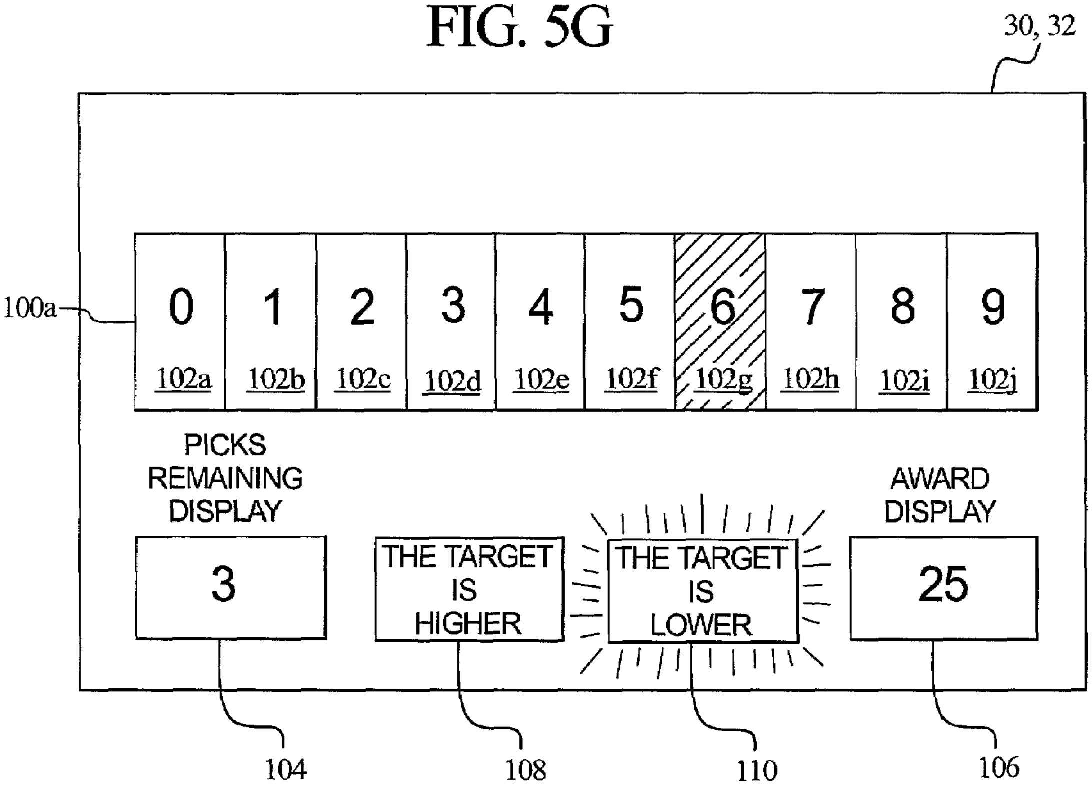

Here, the player picks the number six designated as 102*g*, from the group of numbers 102 in the second target set 100 as illustrated in FIG. 5F. The processor of the gaming device 10 determines whether this pick is the target number or if the target number is higher or lower than the picked number. In this case, as shown in FIG. 5G, the target number four is lower than the picked number. Thus, the target number indicator 110 is illuminated, which notifies the player that the target number is lower than the picked number. On the next pick, the player must pick a lower number than their first pick in this target set to obtain the target number. After this pick, the player has only three picks remaining as indicated by the pick remaining display 104.

Figure 5H:
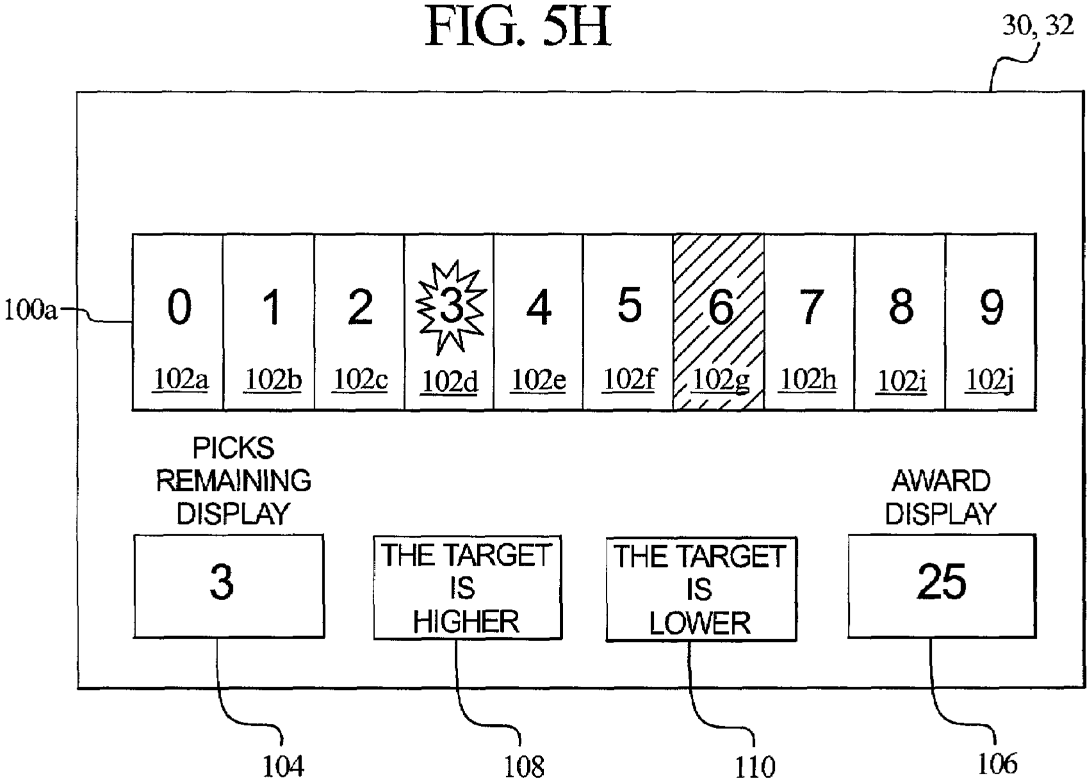
FIGS. 5H and 5I are enlarged front elevation views of one of the display devices of FIGS. 1A and 1B illustrating a second pick by the player in the target set, which is the fifth overall pick in the bonus game, and the response by the gaming device.
Figure 5I:
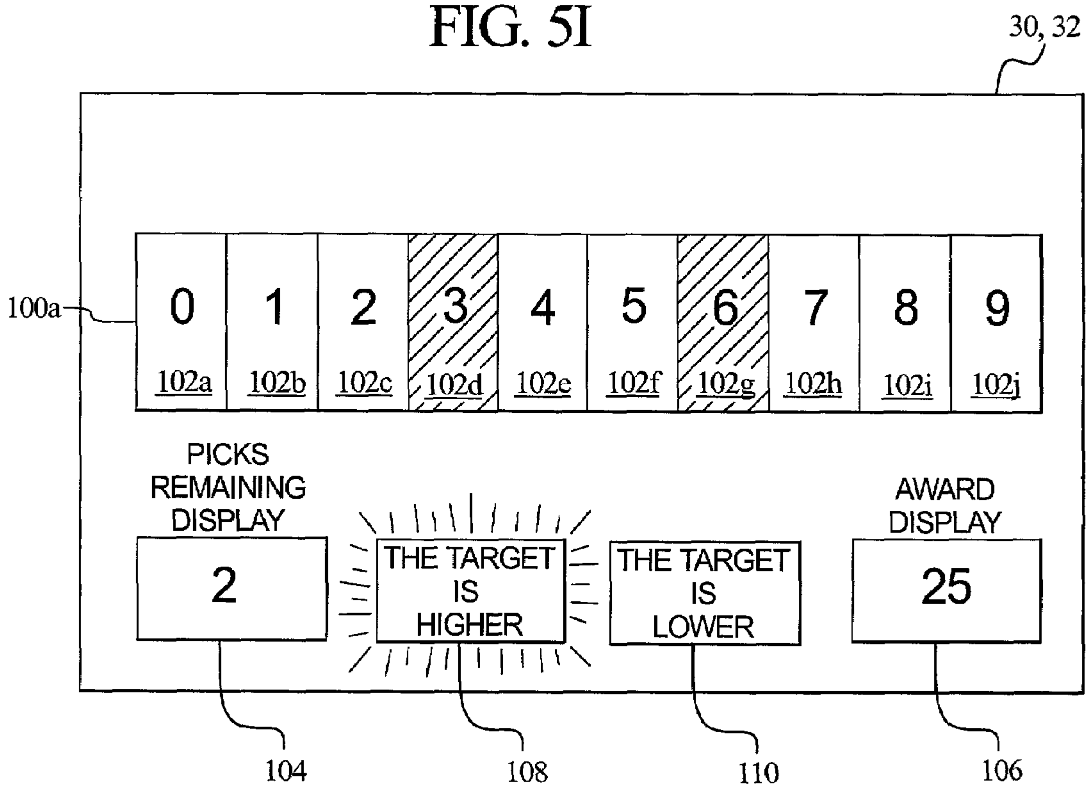

In FIG. 5H, the player makes their second pick in the target set and the sixth pick overall in the bonus game. The player picks the number three designated as 102*d*. This pick is lower than their previous pick of six that is highlighted. However, as FIG. 5I illustrates, this pick is still not the target number. The processor of the gaming device 10 determines that the target number four is higher than the player's second pick, three, and notifies the player by illuminating the target symbol indicator 108. The player now must pick either the four (102*e*) or five (102*f*) with their next pick. The player has only two picks remaining as shown in the pick display 104.

Figure 5J:
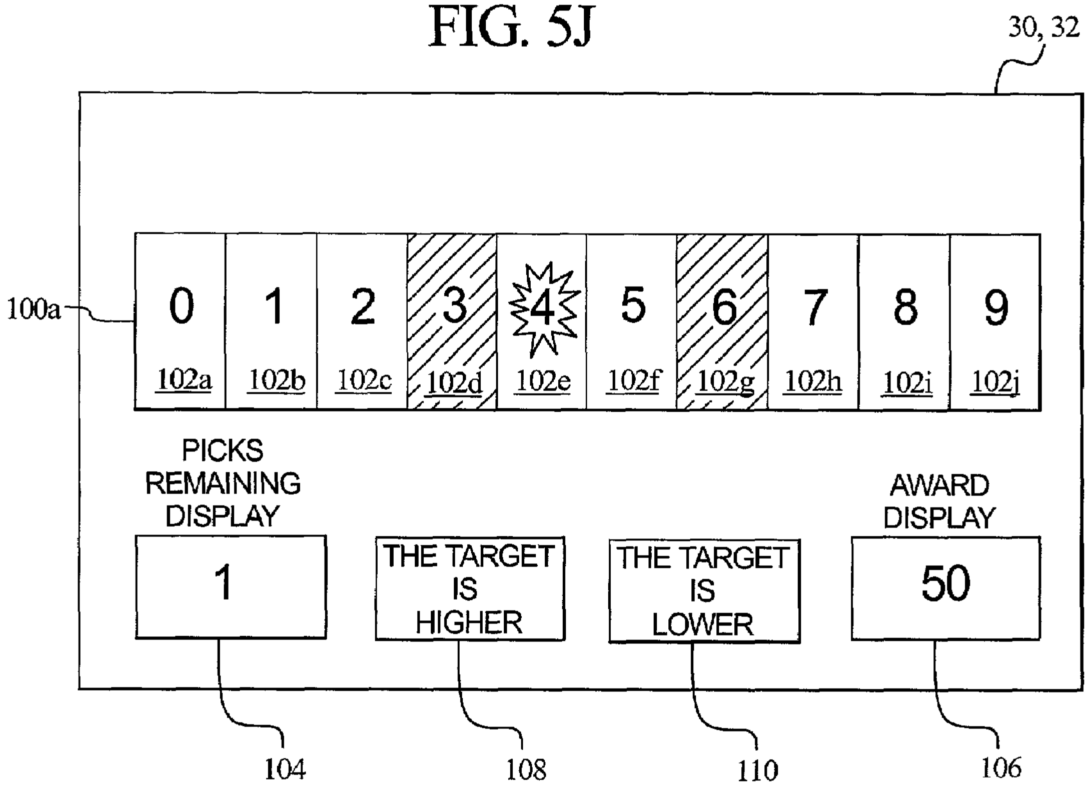
FIG. 5J is an enlarged front elevation view of one of the display devices of FIGS. 1A and 1B illustrating a third pick by the player in the target set, which is the sixth overall pick in the bonus game, that results in a second target symbol and an award.

Referring now to FIG. 5J, the player picks the target number from the second target set 100*a*. The player picked the number four (102*e*), which is the target number. The gaming device provides an award of twenty-five to the player. The award of twenty-five is added to the player's previous award of twenty-five to give a total award for the bonus game of fifty. The pick remaining display 104 now shows that the player has only one pick remaining in this game to obtain another target number.

Figure 5K:
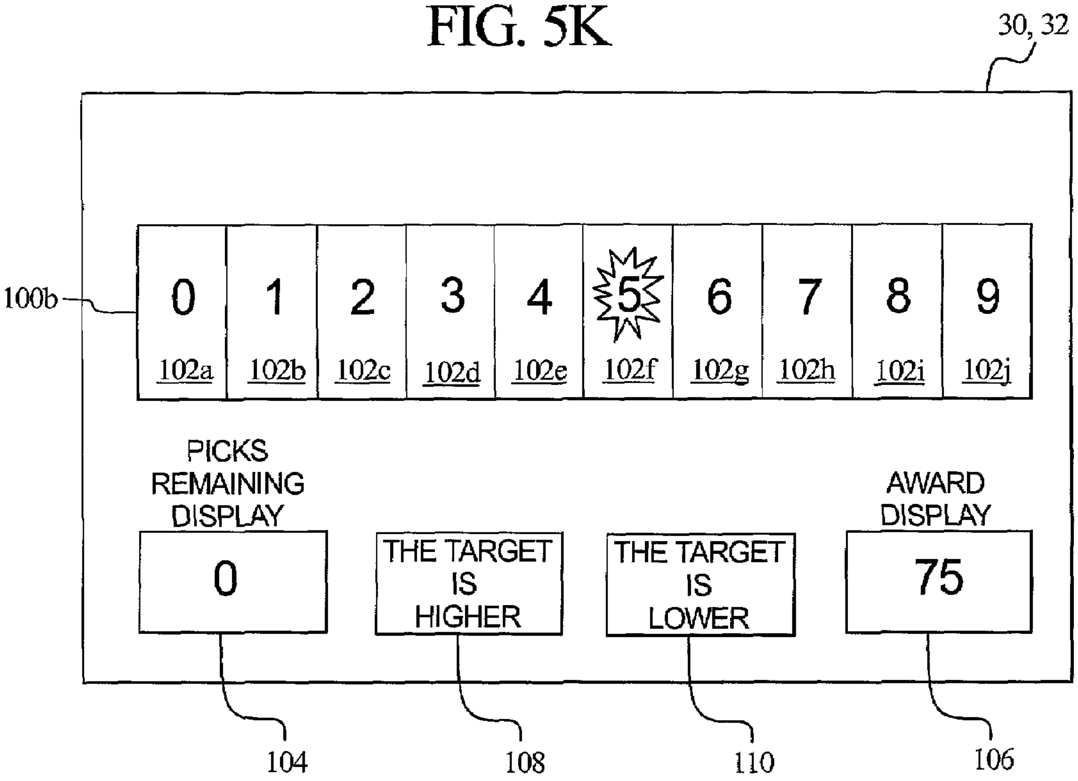
FIG. 5K is an enlarged front elevation view of one of the display devices of FIGS. 1A and 1B illustrating a first pick in a new target set, which is the seventh overall and final selection in the bonus game, that results in a third target symbol and an award.

In FIG. 5K, the player makes a first pick in the third target set 100*b*. The gaming device determines the target number to be the number five (102*f*). Although this is the player's first pick in the new target set, it is the player's seventh and final pick in the bonus game. The player picks the number five (102*f*) from the third target set. Fortunately for the player, the player picked the target number in the third target set on their first pick. The gaming device provides an award of twenty-five to the player for picking the target number. The player now has a total award of seventy-five for the bonus game. Since this is the final pick, the player receives a total award of seventy-five for the bonus game as indicated by the award display 106. If the player did not pick the target number with the player's final pick, the player may not obtain an award for the third target set 100*b*. It should be appreciated that the award associated with each subsequent target set or target number increases in one embodiment.

Figure 6:
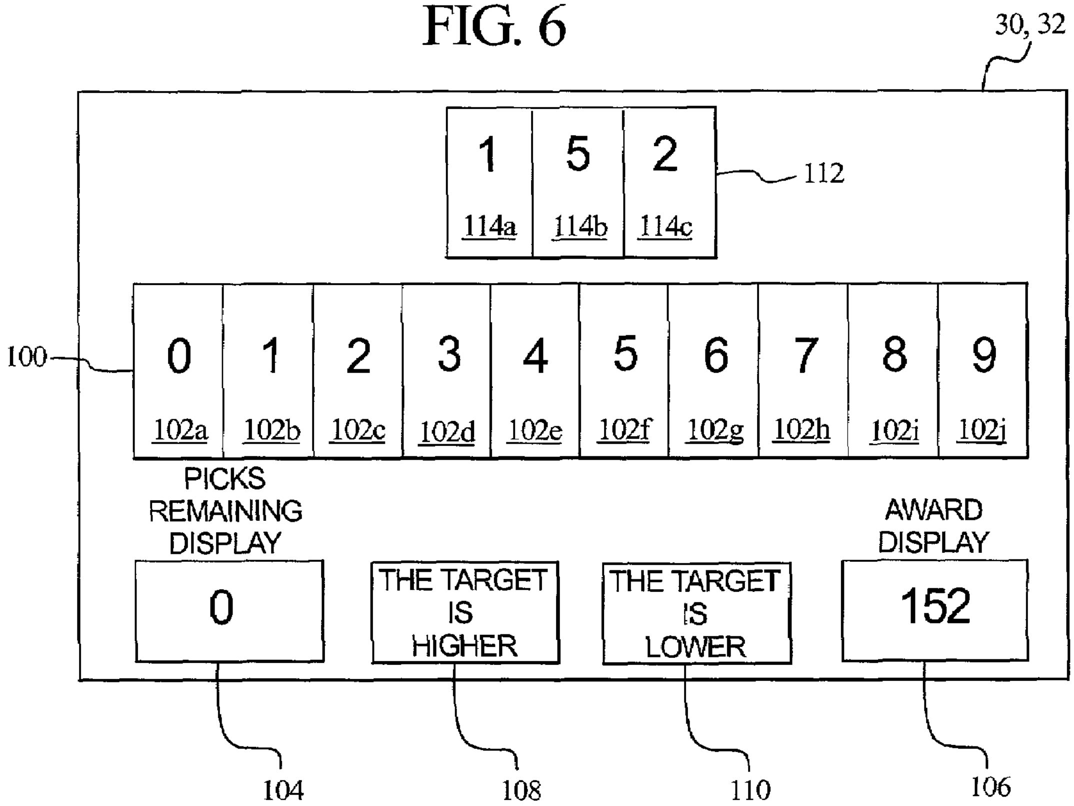
FIG. 6 is an enlarged front elevation view of one of the display devices of FIGS. 1A and 1B illustrating another embodiment of the present invention where the bonus game award equals the value of a target symbol combination.

Referring now to FIG. 6, another embodiment of the present invention is illustrated where the award or combined award equals a combination of target symbols. The symbols in this embodiment are preferably numbers. However, it should be appreciated that the symbols can be any suitable symbols desired by the game implementor. In this embodiment, the gaming device provides an award for the combination of each picked target number. The award or combined award is the order of the target numbers. Once the target number is picked, the target number is transferred to the award combination 112. The award combination preferably includes three award locations 114 including a first award location 114*a*, a second award location 114*b* and a third award location 114*c*. It should be appreciated that an award combination can include any suitable number of award locations as desired.

In this illustration, the player picked the first target number, which was the number one (102*b*). The number one, therefore, is transferred to the first award location 114*a*. The player then picked the target number five (102*f*) from the second target set. This target number is placed in the second award location 114*b* in the award combination 112. If the player ran out of picks at this point in the bonus game, the player would receive the award indicated by the award combination. The award would be the value represented by the first and second target numbers in award locations 114*a* and 114*b*, which is fifteen. This is a relatively low bonus award because the first number is a low number. Because of such possibility, the game implementor may want to weight higher numbers in the target set to be randomly selected for the first target set to increase the award to the player in such cases. Alternatively, if the award is below a pre-determined threshold, the processor may cause a replay of the game to provide a sufficient award to the player. Alternatively, the number may be used as a non-credit value such as a multiplier, number of free spins or number of free games.

In the third target set, the player picked the third target number, which was two. The target number two is transferred to the third and final award location 114*c* in the award combination 112. In this embodiment, the bonus game ends when the player completes the award combination or runs out of picks. Here, the player completed the award combination 112. The player receives the total award indicated by the award combination 112, which is one hundred fifty-two. This award is displayed in the award display 108.

In one aspect of this embodiment, the player may receive an additional award (not shown) for completing the award combination 112. The additional award may be a predetermined award, a random award or any type of award desired. In another aspect of this embodiment, each subsequent target set is larger in size, or includes more symbols or numbers. By increasing the target set size, the level of difficulty of obtaining the target numbers in each subsequent target set increases. For example, in a game with three target sets, the first target set includes five numbers, the second target set includes seven numbers and the third target set includes ten numbers. It should also be appreciated that the target set size could decrease or could be randomly determined.

In another embodiment of the present invention, the gaming device provides additional awards to a player for having picks remaining at the end of a bonus game. Preferably, the gaming device provides an award for each remaining pick. In another aspect of this embodiment, the player uses their remaining picks to select additional awards or prizes. In another embodiment, the player is provided with another bonus level or bonus game for having picks remaining in the game. The player uses their remaining picks in that bonus level or bonus game to obtain larger awards. In a further aspect of this embodiment, the gaming device displays several masked or hidden selections to the player (not shown). The player picks a selection with each remaining pick from the bonus game. Each selection provides an additional award to the player. The additional award may be any type of award desired by the game implementor.

Figure 7:
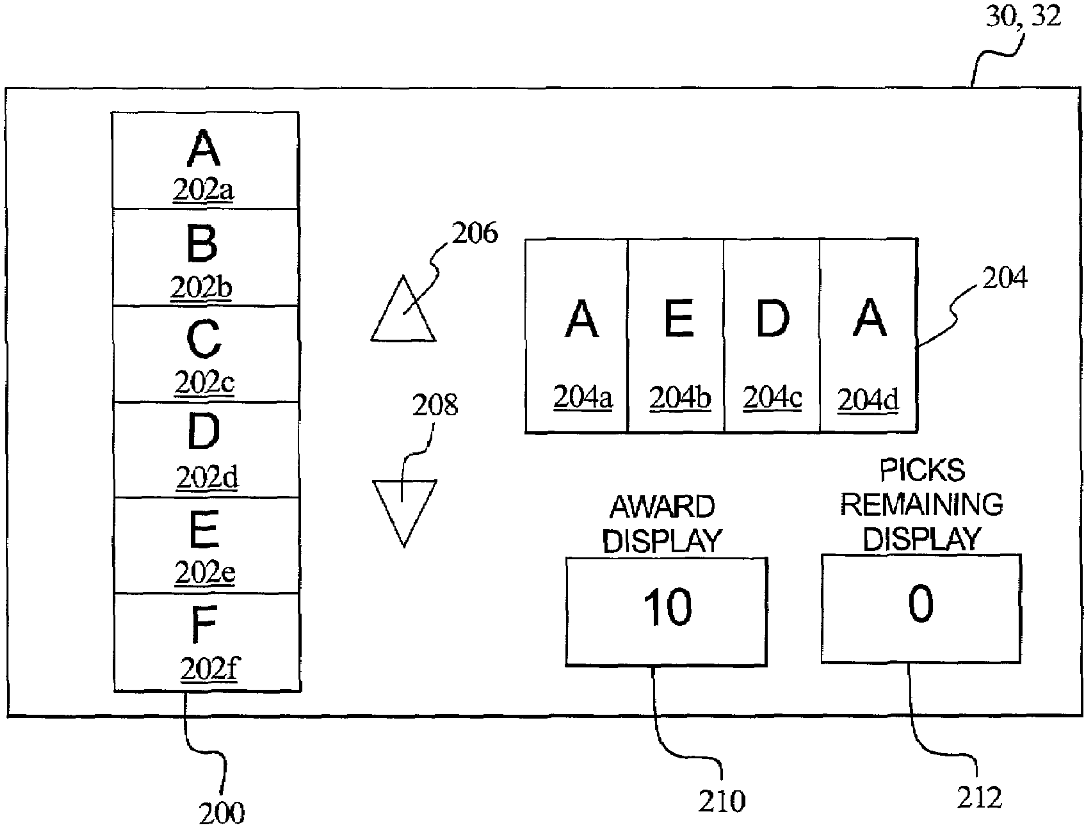
FIG. 7 is an enlarged front elevation view of one of the display devices of FIGS. 1A and 1B illustrating another embodiment of the present invention.

Referring now to FIG. 7, the display device 30 or 32 illustrates another embodiment of the present invention. In this embodiment, the target set 200 includes symbols 202 designated as 202*a* to 202*f*. The symbols 202 are letters in the alphabet and are arranged in a vertical configuration. The gaming device provides a predetermined award associated with each target letter. The award can also be based on the total number of target letters obtained by a player in the bonus game. The relationship indicators are represented by an up arrow 206 and a down arrow 208. Relationship indicator 206 is highlighted or illuminated if a target letter is higher than or above a picked symbol. If the target letter is lower than or below a picked symbol then the down arrow 208 is highlighted. If a player obtains a target letter in the target set 100, the target letter is transferred to the award combination 204. The award combination includes one or more award locations. In this illustration, the award combination has four award locations 204*a* to 204*d*. The first award location 204*a* represents the first target letter obtained by the player, the second award location 204*b* represents the second target letter obtained by the player, and so forth. In this illustration, the player obtained all four of the target letters in the award combination 204. Each target letter represents an award determined by the game implementor. This embodiment also has an award display 210 that indicates the accumulated award provided to the player during the bonus game. It also includes a pick remaining display 212 that indicates the number of picks remaining in the bonus game.

Figure 8:
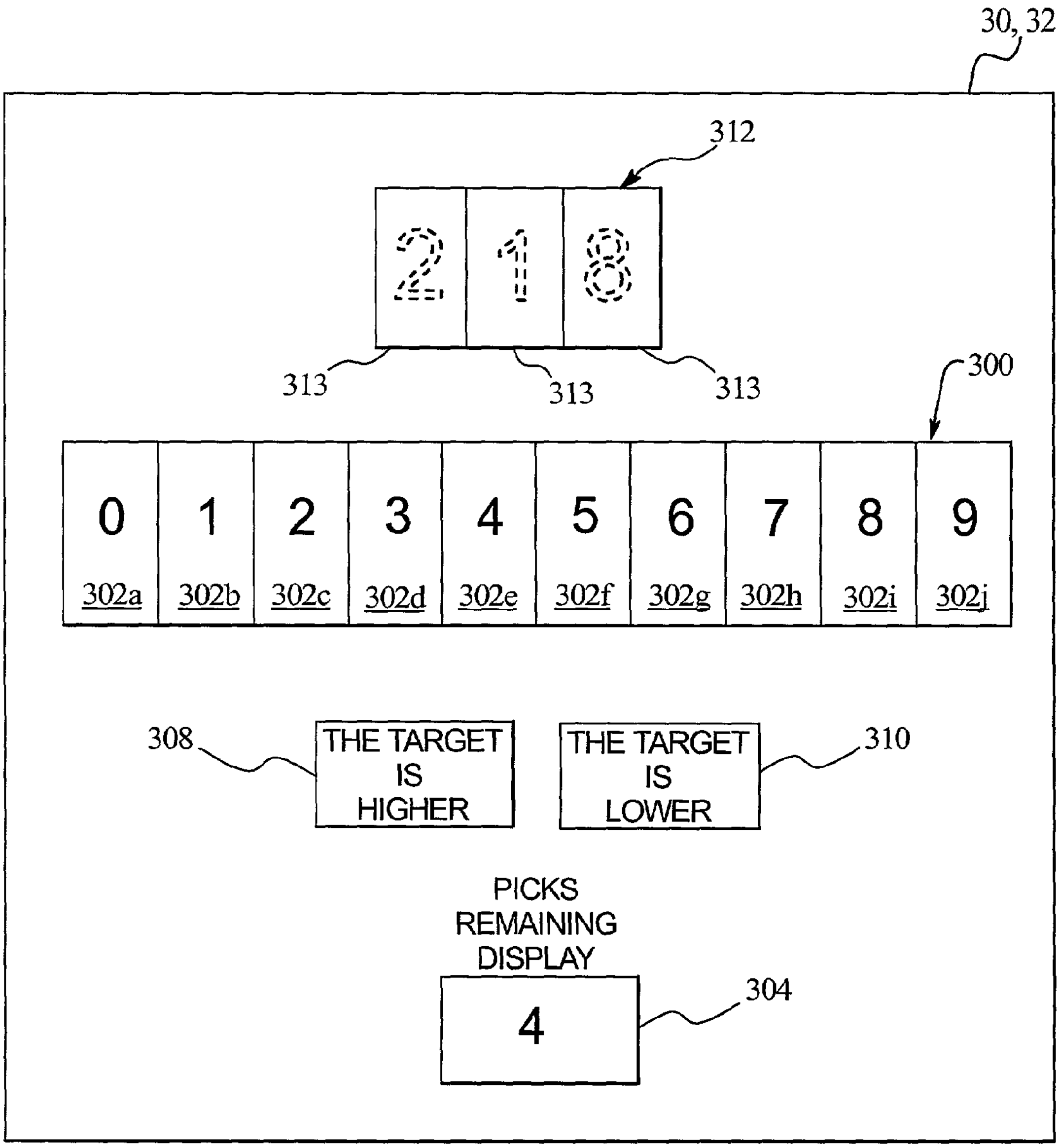
FIG. 8 is an enlarged front elevation view of the display devices of FIGS. 1A and 1B illustrating a further embodiment of the present invention wherein the bonus game includes a target symbol combination.

Referring now to FIG. 8, a further embodiment of the present invention is illustrated where the gaming device provides the player with a number of picks at the beginning of the bonus game. The number of picks such as four is displayed to the player by the picks remaining display 304. The gaming device also displays a masked target combination 312 having one or more masked target numbers 313. The player picks a number 302*a* to 302*j* from the target set 300 until the player picks a target number. The target number indicators 308 and 310 indicate whether the selected number is higher or lower than the target number.

In FIG. 8, the target combination includes three masked target numbers "2," "1" and "8" (shown in phantom). The processor forms the target combination 312 by randomly selecting and placing the target numbers 313 in the target combination from a plurality of target numbers (not shown) based on the order that the target numbers are selected. It should be appreciated that the target combination may include target symbols or other characters as desired by the game implementor. It should also be appreciated that the order that the target numbers are placed in the target combination can be any suitable order. Additionally, the target combination may be predetermined by the processor. Each picked target number in a target set is a digit in the target combination.

If the player picks all of the target numbers or digits in the combination, the gaming device preferably provides an award (not shown) to the player. The award is preferably based on the number of picks that the player has remaining in the bonus game. In one embodiment, the player uses their remaining picks to select additional awards or prizes. In another embodiment, the player is provided with another bonus level or bonus game and the player uses their remaining picks in that bonus level or bonus game to obtain additional awards.

In another embodiment, the award provided to the player for picking all of the target numbers or symbols in the target combination is based on the number of picks that the player actually uses to obtain the target combination. In this embodiment, the gaming device provides a larger award to the player for using less picks to obtain the target combination. It should also be appreciated that the player may also obtain an additional award or larger award for obtaining the target number or symbol in a target set based on the number of picks used by the player.

In an alternative embodiment, the number of picks provided to the player is not displayed to the player. In this embodiment, the player's excitement and enjoyment of the bonus game increases because the player does not know when their picks will run out and therefore, when the game will end.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device comprising:

a primary game operable upon a wager by a player;

a display device;

a processor which communicates with said display device;

a secondary game triggered upon an event associated with said primary game;

a target set in said secondary game including a plurality of player selectable symbols, displayed by said display device, wherein at least one of said selectable symbols is designated as a target symbol by said processor;

a symbol selector in communication with said processor;

at least one relationship indicator controlled by said processor, wherein, after each time said player selects any one of said selectable symbols using said symbol selector which is not said target symbol and not a last selection, said relationship indicator identifies a relationship in said secondary game between said target symbol and the selected symbol including a subset of selectable symbols of said target set which includes at least said target symbol and enables said player to select said target symbol with a next selection in said subset; and an award based, at least in part, on said target symbol in said secondary game, whereby said award is provided to said player after said player selects said target symbol or the last selection in said secondary game.

2. The gaming device of claim 1, wherein said symbol selector includes a plurality of buttons, each of said buttons corresponding to each of said player selectable symbols in said target set.

3. The gaming device of claim 1, wherein said symbol selector includes a touch screen connected to the display device.

4. The gaming device of claim 1, wherein said relationship indictor is displayed by the display device.

5. The gaming device of claim 1, which includes a plurality of relationship indicators wherein, after each time said player selects any one of said selectable symbols which is not said target symbol and not a last selection, said relationship indicators identify a relationship between said target symbol and the symbol selected by said player using said symbol selector including a subset of selectable symbols in said target set which includes at least said target symbol and enables said player to select said target symbol with a next selection in said subset.

6. The gaming device of claim 1, which includes a predetermined number of picks, wherein a player selects symbols until the player picks the target symbol in the target set or there are no picks remaining.

7. The gaming device of claim 6, wherein the award includes an additional value if the player has picks remaining after the player selects the target symbol in the target set.

8. The gaming device of claim 1, wherein the award is based on the value of the selected target symbol.

9. The gaming device of claim 8, wherein the award equals the value of the selected target symbol.

10. The gaming device of claim 1, which includes a plurality of target sets.

11. The gaming device of claim 10, wherein the award is based on the target symbols selected by the player in each of said target sets.

12. The gaming device of claim 10, wherein the awards associated with each target symbol selected by the player are combined by the processor to provide a combined award for the player.

13. The gaming device of claim 12, wherein the combined award is based on the order of each award associated with each target symbol.

14. The gaming device of claim 12, wherein each of said awards equals the value of said corresponding target symbol from said target sets.

15. The gaming device of claim 1, wherein each of the symbols is associated with a probability of being designated as a target symbol in said target set.

16. The gaming device of claim 15, wherein the probability of being designated associated with one of the symbols in said target set is greater than the probability of being designated associated with another of said symbols in the target set.

17. A gaming device comprising:

a primary game operable upon a wager by a player;

a display device;

a processor;

a secondary game triggered upon an event associated with said primary game;

a number of picks in said secondary game;

a target set displayed to said player in said secondary game including a plurality of selectable symbols, which are each associated with a value wherein at least one of said symbols is randomly designated as a target symbol by said processor; and a target symbol indicator in said secondary game wherein, after each time said player picks any one of said selectable symbols which is not said target symbol and said player has at least one pick remaining in said secondary game, said target symbol indicator identifies a relationship between said target symbol and the picked symbol including a subset of selectable symbols of said target set which includes at least said target symbol and enables said player to select said target symbol with a next selection in said subset; and a symbol selector in communication with said processor, which enables said player to pick symbols in said secondary game until said player picks said target symbol or until there are no picks remaining; and an award based on said target symbol, whereby said award is provided to said player after said player picks said target symbol.

18. The gaming device of claim 17, which includes a plurality of different numbers of picks and a probability of being selected associated with each different number of picks.

19. The gaming device of claim 18, wherein the probability of being selected associated with one of the number of picks is greater than the probability of being selected associated with another number of picks.

20. The gaming device of claim 17, wherein the award includes an additional value if the player has picks remaining after the player selects the target symbol in the target set.

21. The gaming device of claim 17, which includes a plurality of target sets.

22. The gaming device of claim 21, wherein the award is based on the target symbols selected by the player in each of said target sets using all of the number of picks.

23. The gaming device of claim 21, wherein the awards associated with each target symbol selected by the player are combined by the processor to provide a combined award for the player.

24. The gaming device of claim 23, wherein the combined award is based on an order of selection of each target symbol.

25. The gaming device of claim 17, wherein each symbol is associated with a probability of being designated as a target symbol in said target set.

26. The gaming device of claim 25, wherein the probability of being designated associated with one of the symbols in said target set is greater than the probability of being designated associated with another of said symbols in the target set.

27. A gaming device comprising:

a primary game operable upon a wager by a player;

a display device;

a processor;

a secondary game triggered upon an event associated with said primary game;

a plurality of target sets displayed to said player in said secondary game including a plurality of player selectable symbols, wherein at least one of said selectable symbols in each target set is designated as a target symbol for that target set by said processor;

a symbol selector in communication with said processor;

at least one relationship indicator in said secondary game controlled by said processor wherein, after each time said player selects any one of said selectable symbols in one of said target sets using said symbol selector and the selected symbol is not said target symbol for that target set and not a last selection, said relationship indicator identifies a relationship between said target symbol for that target set and the selected symbol including a subset of selectable symbols in that target set which includes at least said target symbol for that target set and enables said player to select said target symbol for that target set with a next selection in said subset; and a combined award based on said target symbols selected by said player in said secondary game.

28. The gaming device of claim 27, wherein the combined award is based on the order of the target symbols selected by the player.

29. The gaming device of claim 27, which includes a number of picks provided to the player by said processor, wherein the player picks symbols in the target sets until the player picks all of said target symbols or until there are no picks remaining.

30. The gaming device of claim 29, wherein the number of picks is predetermined.

31. The gaming device of claim 29, wherein the number of picks is randomly determined.

32. The gaming device of claim 29, which includes an additional award to a player for obtaining all of said target symbols in the target sets.

33. A gaming device comprising:

a base game operable upon a wager by a player;

a display device;

a processor;

a bonus game triggered upon an event associated with said base game;

a target set displayed to said player in said bonus game which includes a plurality of selectable numbers, wherein at least one of said selectable numbers is randomly designated as a target number by said processor;

a number selector in communication with said processor; and a relationship indicator, in said bonus game, controlled by said processor wherein, after each time said player picks any one of said selectable numbers using said number selector and the picked number is not said target number and not a last pick, said relationship indicator identifies a relationship between said target number and the picked number including a subset of selectable numbers of said target set which includes at least said target number and enables said player to select said target number with a next selection in said subset.

34. The gaming device of claim 33, wherein the relationship indicator indicates whether the target number is higher, lower, one away from, next to or equal to the numbers selected by the player in the target set.

35. The gaming device of claim 33, which includes an award provided to the player wherein the award is based on at least one of the group consisting of: the number of target numbers selected by the player, the number of target sets selected by the player, the number of picks used by the player to select the target numbers, and the number of picks remaining from a predetermined plurality of picks.

36. The gaming device of claim 33, which includes a probability of being designated as a target number associated with each number in said target set.

37. The gaming device of claim 36, wherein the probability of being designated associated with one of the numbers in said target set is greater than the probability of being designated associated with another one of said numbers in said target set.

38. The gaming device of claim 36, wherein each number in the target set has an equal probability of being designated as a target number.

39. The gaming device of claim 33, wherein the relationship indicator includes a first indicator which indicates that said target number is higher than a picked number and a second indicator which indicates that said target number is lower than said picked number.

40. A gaming device comprising:

a primary game operable upon a wager by a player;

a display device;

a processor;

a secondary game triggered upon an occurrence of an event associated with said primary game;

a plurality of target sets displayed to said player in said secondary game, each of said target sets including a plurality of player selectable symbols, wherein at least one of said selectable symbols in each target set is designated as a target symbol for that target set by said processor;

a symbol selector in communication with said processor;

a number of picks provided to said player in said secondary game by said processor, wherein said player picks selectable symbols in said target sets in said secondary game until said player picks all of said target symbols or until there are no picks remaining;

at least one relationship indicator, in said secondary game, controlled by said processor wherein, after each time said player picks any one of said selectable symbols in one of said target sets using said symbol selector, and the picked symbol is not said target symbol for that target set and said player has picks remaining, said relationship indicator identifies a relationship in each target set between said target symbol for that target set and the picked symbol including a subset of selectable symbols of said target set, which includes at least said target symbol for that target set and enables said player to pick said target symbol with a next selection in said subset; and a combined award based on the order of said target symbols selected by said player.

41. The gaming device of claim 40, which includes a predetermined award level, wherein if the combined award is less than the predetermined award level, the combined award is used as a non-credit value.

42. The gaming device of claim 41, wherein the non-credit value is selected from the group consisting of: a number of free spins, a multiplier, and a number of free games.

43. A gaming device comprising:

a primary game operable upon a wager by a player;

a display device;

a processor which communicates with said display device;

a secondary game triggered upon an occurrence of an event associated with said primary game;

a target set, in said secondary game, including a plurality of player selectable symbols displayed by said display device, wherein at least one of said selectable symbols is designated as a target symbol by said processor;

a symbol selector in communication with said processor;

at least one relationship indicator in said secondary game, controlled by said processor wherein, after each time said player selects any one of said selectable symbols using said symbol selector and the selected symbol is not said target symbol and not a last pick, said relationship indicator identifies a relationship between said target symbol and the selected symbol including a subset of selectable symbols of the target set which includes at least said target symbol and enables said player to select said target symbol with a next pick in said subset; and an award based on a number of picks used by the player to select said target symbol in said secondary game, whereby said award is provided to said player after said player selects said target symbol.

44. The gaming device of claim 43, which includes a plurality of target sets in said secondary game, having a plurality of player selectable symbols displayed by said display device, wherein at least one of said symbols in each target set is designated as a target symbol by said processor, and wherein the award is based on the number of picks used by the player to select the target symbols in the target sets.

45. A gaming device comprising:

a primary game operable upon a wager by a player;

a display device;

a processor which communicates with said display device;

a secondary game triggered upon an occurrence of an event associated with said primary game;

a target set, including a plurality of player selectable symbols displayed in said secondary game by said display device, wherein at least one of said selectable symbols is designated as a target symbol by said processor;

a symbol selector in communication with said processor;

at least one relationship indicator in said secondary game, controlled by said processor, wherein, for each time said player selects any one of said selectable symbols using said symbol selector and the selected symbol is not said target symbol and not a last selection, said relationship indicator identifies a relationship between said target symbol and the selected symbol including a subset of selectable symbols of said target set which includes at least said target symbol and enables said player to select said target symbol with a next selection in said subset; and an award based on a number of picks remaining from a plurality of picks provided to said player whereby said award is provided to said player after said player selects said target symbol.

46. The gaming device of claim 45, which includes a plurality of target sets in said secondary game having a plurality of player selectable symbols displayed by said display device, wherein at least one of said selectable symbols in each target set is designated as a target symbol by said processor, and wherein the award is based on the number of picks remaining from a plurality of picks provided to the player after the player picks all of the target symbols in the target sets.

47. A gaming device comprising:

a primary game operable upon a wager by a player;

a display device;

a processor which communicates with said display device;

a secondary game triggered upon an occurrence of an event associated with said primary game;

a plurality of target sets in said secondary game, each target set including a plurality of player selectable symbols displayed by said display device, wherein at least one of said selectable symbols is designated as a target symbol by said processor;

a symbol selector in communication with said processor;

at least one relationship indicator in said secondary game controlled by said processor wherein, for each time said player selects any one of said selectable symbols using said symbol selector which is not said target symbol and not a last selection, said relationship indicator identifies a relationship between said target symbol and the selected symbol including a subset of selectable symbols of the target set which includes at least said target symbol and enables said player to select said target symbol with a next selection in said subset; and an award provided to said player based on said target symbol, whereby said award is provided to said player after said player selects said target symbol in said secondary game.

48. The gaming device of claim 47, wherein the award is based on the total number of target symbols selected by the player in said secondary game.

49. A gaming device comprising:

a primary game operable upon a wager by a player;

a display device;

a processor;

a secondary game triggered upon an occurrence of an event associated with said primary game;

a number of picks in said secondary game;

a target set, in said secondary game, displayed to said player including a plurality of player selectable symbols, wherein at least one of said selectable symbols is randomly designated as a target symbol by said processor;

a target symbol indicator, in said secondary game, wherein, after each time said player picks any one of said selectable symbols in said target set which is not said target symbol and said player has at least one pick remaining, said target symbol indicator identifies a relationship between said target symbol and the picked symbol, including a subset of selectable symbols of said target set which includes at least said target symbol and enables said player to pick said target symbol with a next pick in said subset; and a symbol selector in communication with said processor, which enables said player to pick selectable symbols until said player picks said target symbol or until there are no picks remaining.

50. The gaming device of claim 49, which includes an award provided to the player wherein the award is based on at least one of the group consisting of: the number of target symbols selected by the player, the number of target sets selected by the player, the number of picks used by the player to select the target symbols, and the number of picks remaining from a predetermined plurality of picks.

51. The gaming device of claim 49, which includes at least one additional bonus game provided to a player when the player has picks remaining after the player picks the target symbol in the target set in said secondary game.

52. The gaming device of claim 51, which includes an additional award provided to the player based on the number of remaining picks in said secondary game.

53. The gaming device of claim 51, wherein the remaining picks are provided to the player in the additional bonus game or games.

54. A gaming device comprising:

a primary game operable upon a wager by a player;

a display device;

a processor which communicates with said display device;

a secondary game triggered upon an occurrence of an event associated with said primary game;

a plurality of target sets, in said secondary game, each target set including a plurality of player selectable symbols displayed by said display device, wherein at least one of said selectable symbols is designated as a target symbol by said processor;

a target symbol combination in said secondary game including at least one target symbol from said target sets displayed by said display device;

a symbol selector in communication with said processor;

at least one relationship indicator in said secondary game controlled by said processor wherein, after each time said player selects any one of said selectable symbols in one of said target sets using said symbol selector, and the selected symbol is not said target symbol and not a last selection, said relationship indicator identifies a relationship between said target symbol in said target set and the selected symbol including a subset of selectable symbols in said target set, which includes at least said target symbol and enables said player to select said target symbol with a next selection in said subset; and an award provided to said player when said player selects all of said target symbols in said target symbol combination.

55. The gaming device of claim 54, which includes a number of picks provided to the player.

56. The gaming device of claim 55, wherein the number of picks is predetermined.

57. The gaming device of claim 55, wherein the number of picks is randomly determined.

58. The gaming device of claim 55, which includes an additional award provided to the player where the player has picks remaining after the player picks all of the target symbols in the target symbol combination.

59. The gaming device of claim 58, wherein the additional award is a non-credit value.

60. The gaming device of claim 59, wherein the non-credit value is selected from the group consisting of: at least one free game, at least one free spin and at least one multiplier.

61. A method of operating a gaming device, the method comprising:

(a) displaying a primary game operable upon a wager by a player;

(b) displaying a secondary game upon an occurrence of a triggering event associated with the primary game;

(c) determining a target symbol in said secondary game in a target set having a plurality of selectable symbols;

(d) displaying said target set;

(e) enabling the player to pick any one of said selectable symbols from said target set;

(f) determining whether the picked symbol is said target symbol;

(g) each time the player picks one of said selectable symbols and that picked symbol is not said target symbol and there is at least one pick remaining:

(i) indicating a relationship between the picked symbol and said target symbol including a subset of selectable symbols of the target set which includes at least said target symbol and enables said player to select said target symbol with a next pick in said subset; and (ii) repeating steps (e) to (g) until a number of picks of said selectable symbols are used by said player or until said player picks said target symbol; and (h) if said player picks said target symbol, providing an award, an advancement to another target set, or an advancement to another bonus game to said player.

62. The method of claim 61, which includes providing a predetermined number of picks to a player.

63. The method of claim 61, which includes providing (a) to (h) through a data network.

64. The method of claim 63, wherein the data network is an internet.

65. A gaming device comprising:

a primary game operable upon a wager by a player;

a display device;

a processor;

a secondary game triggered upon an occurrence of an event associated with said primary game;

a plurality of target sets displayed to said player in said secondary game, each of said target sets including a plurality of selectable numbers, wherein at least one of said numbers in each target set is designated as a target number for that target set by said processor;

a number selector in communication with said processor;

at least one relationship indicator in said secondary game controlled by said processor wherein, after each time said player picks any one of said selectable numbers using said number selector and the picked number is not said target number and not a last pick, said relationship indicator identifies a relationship in each target set between said target number for that target set and the number selected by said player using said number selector including a subset of selectable numbers of said target set which includes at least said target number and enables said player to select said target number with a next selection in said subset; and an award provided to said player, said award having a numerical value, wherein a plurality of target numbers selected by said player are digits of said numerical value.

66. The gaming device of claim 65, wherein said digits of said numerical value are arranged in the order in which said player selects said target numbers.

67. The gaming device of claim 65, which includes a number of picks provided to the player by said processor, wherein the player picks numbers in the target sets until the player picks all of said target numbers or until there are no picks remaining.

68. The gaming device of claim 67, wherein the number of picks is predetermined.

69. The gaming device of claim 67, wherein the number of picks is randomly determined.

70. The gaming device of claim 65, wherein each number is associated with a probability of being designated as a target number in said target set.

71. The gaming device of claim 70, wherein the probability of being designated associated with one of the numbers in said target set is greater than the probability of being designated associated with another of said numbers.

* * * * *